US012664778B1

(12) United States Patent (10) Patent No.: US 12,664,778 B1
Nandy et al. (45) Date of Patent: Jun. 23, 2026

(54) SYSTEMS AND METHODS FOR THE PRESENTATION OF GRAPHICAL OVERLAYS

(71) Applicant: Amazon Technologies, Inc., Seattle, WA (US)

(72) Inventors: Kaustav Nandy, Bengaluru (IN); Shivam Agarwal, Agra (IN); Yash Pandya, Navi Mumbai (IN)

(73) Assignee: Amazon Technologies, Inc., Seattle, WA (US)

( * ) Notice: Subject to any disclaimer, the term of this patent is extended or adjusted under 35 U.S.C. 154(b) by 256 days.

(21) Appl. No.: 18/448,735

(22) Filed: Aug. 11, 2023

(51) Int. Cl.
*G06V 20/40* (2022.01)
*G06V 10/74* (2022.01)
*H04N 21/431* (2011.01)

(52) U.S. Cl.
CPC .............. *G06V 20/42* (2022.01); *G06V 10/74* (2022.01); *H04N 21/4316* (2013.01)

(58) Field of Classification Search
CPC ..... G06V 20/42; G06V 10/74; H04N 21/4316
See application file for complete search history.

(56) References Cited

U.S. PATENT DOCUMENTS

| | | | | |
|---|---|---|---|---|
| 2015/0281638 A1* | 10/2015 | Miyauchi | ............. | H04N 7/0117 348/445 |
| 2021/0133458 A1* | 5/2021 | Tuxen | .................... | G06V 20/42 |
| 2022/0103891 A1* | 3/2022 | Xu | .................... | H04N 21/2187 |

OTHER PUBLICATIONS

Ramasso, Emmanuel, et al. "Human shape-motion analysis in athletics videos for coarse to fine action/activity recognition using transferable belief model." Electronic Letters on Computer Vision and Image Analysis 7.4 (2009): 32-50. (Year: 2009).*
Einfalt, Moritz, et al. "Frame-level event detection in athletics videos with pose-based convolutional sequence networks." Proceedings Proceedings of the 2nd International Workshop on Multimedia Content Analysis in Sports. 2019. (Year: 2019).*
Robberechts, Pieter, Jan Van Haaren, and Jesse Davis. "Who will win it? An in-game win probability model for football." Machine Learning and Data Mining for Sports Analytics ECML/PKDD 2019 workshop. Machine Learning and Data Mining for Sports Analytics Organising Committee, 2019. (Year: 2019).*

* cited by examiner

*Primary Examiner* — Andrew M Moyer
*Assistant Examiner* — Dylan John Mendez Muniz
(74) *Attorney, Agent, or Firm* — Eversheds Sutherland (US) LLP

(57) ABSTRACT

Systems and methods for the presentation of visual overlays are provided. Particularly, the systems and methods described herein provide for time synchronization between different data sources associated with a live broadcast of an event (such as the video and/or audio feed of the live event and metadata including data captured by sensors included at the live event). The systems and methods also provide for player identification and tracking within the video feed such that the information in the metadata may be correlated to the players and events shown in the video feed. Performing this time synchronization and player identification and tracking, allows for graphical overlays including relevant information to be displayed over the live broadcast of the event. For example, in an American football game, information about players or plays occurring on the field may be displayed in real-time.

16 Claims, 13 Drawing Sheets

701

702

400

402 Input Data

404 Player Detection

406 Helmet Tracking

408 Event Detection

410 Homography Computation

412 Helmet Track Identification

414 Graphical Overlay

602

604

610

608
606

(A) Median Distance Cost=6

(B) Median Distance Cost=15

(c) Median Distance Cost=31

(D) Median Distance Cost=119

900

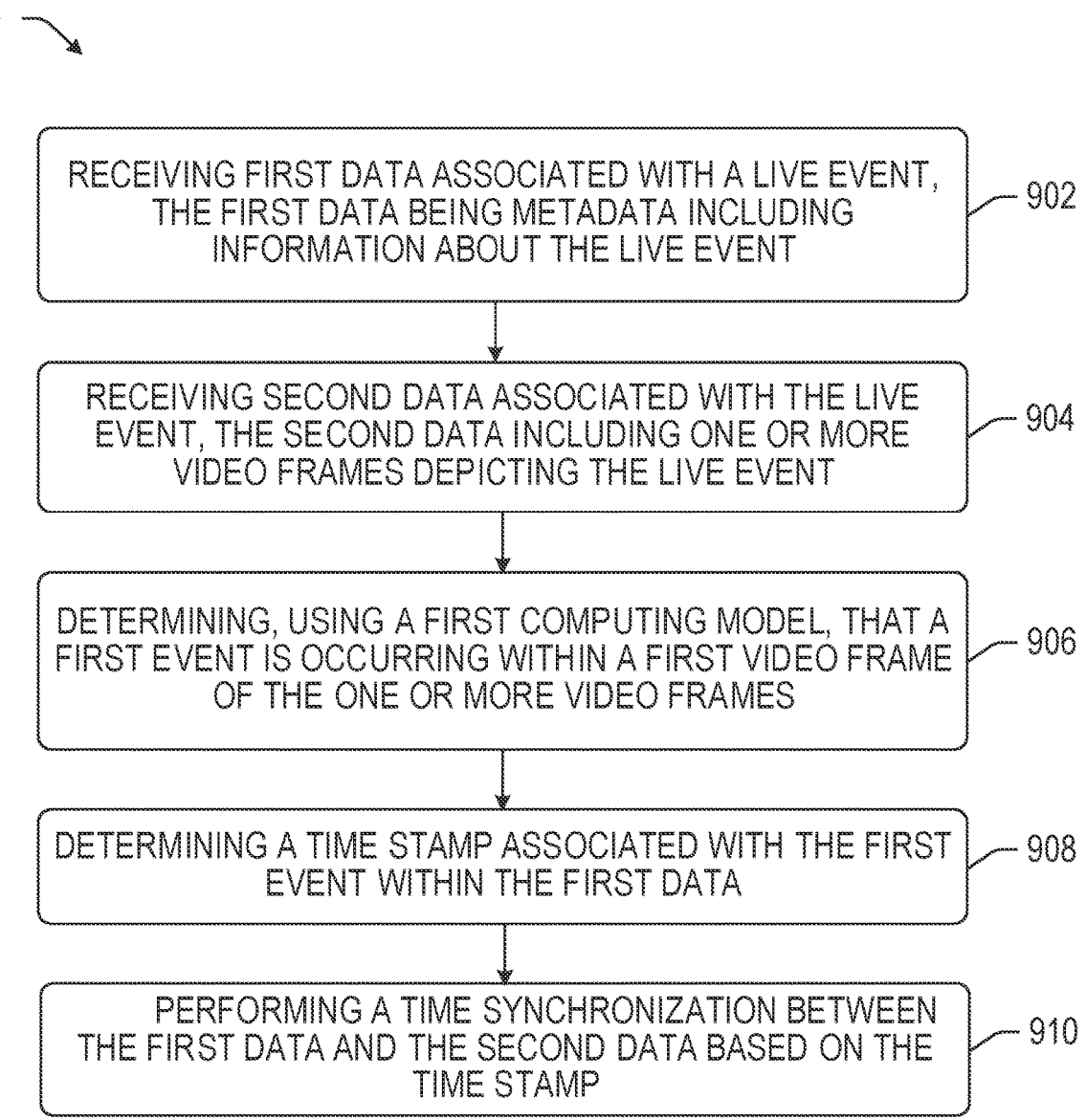

RECEIVING FIRST DATA ASSOCIATED WITH A LIVE EVENT, THE FIRST DATA BEING METADATA INCLUDING INFORMATION ABOUT THE LIVE EVENT — 902

RECEIVING SECOND DATA ASSOCIATED WITH THE LIVE EVENT, THE SECOND DATA INCLUDING ONE OR MORE VIDEO FRAMES DEPICTING THE LIVE EVENT — 904

DETERMINING, USING A FIRST COMPUTING MODEL, THAT A FIRST EVENT IS OCCURRING WITHIN A FIRST VIDEO FRAME OF THE ONE OR MORE VIDEO FRAMES — 906

DETERMINING A TIME STAMP ASSOCIATED WITH THE FIRST EVENT WITHIN THE FIRST DATA — 908

PERFORMING A TIME SYNCHRONIZATION BETWEEN THE FIRST DATA AND THE SECOND DATA BASED ON THE TIME STAMP — 910

FIG. 9

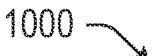

1000

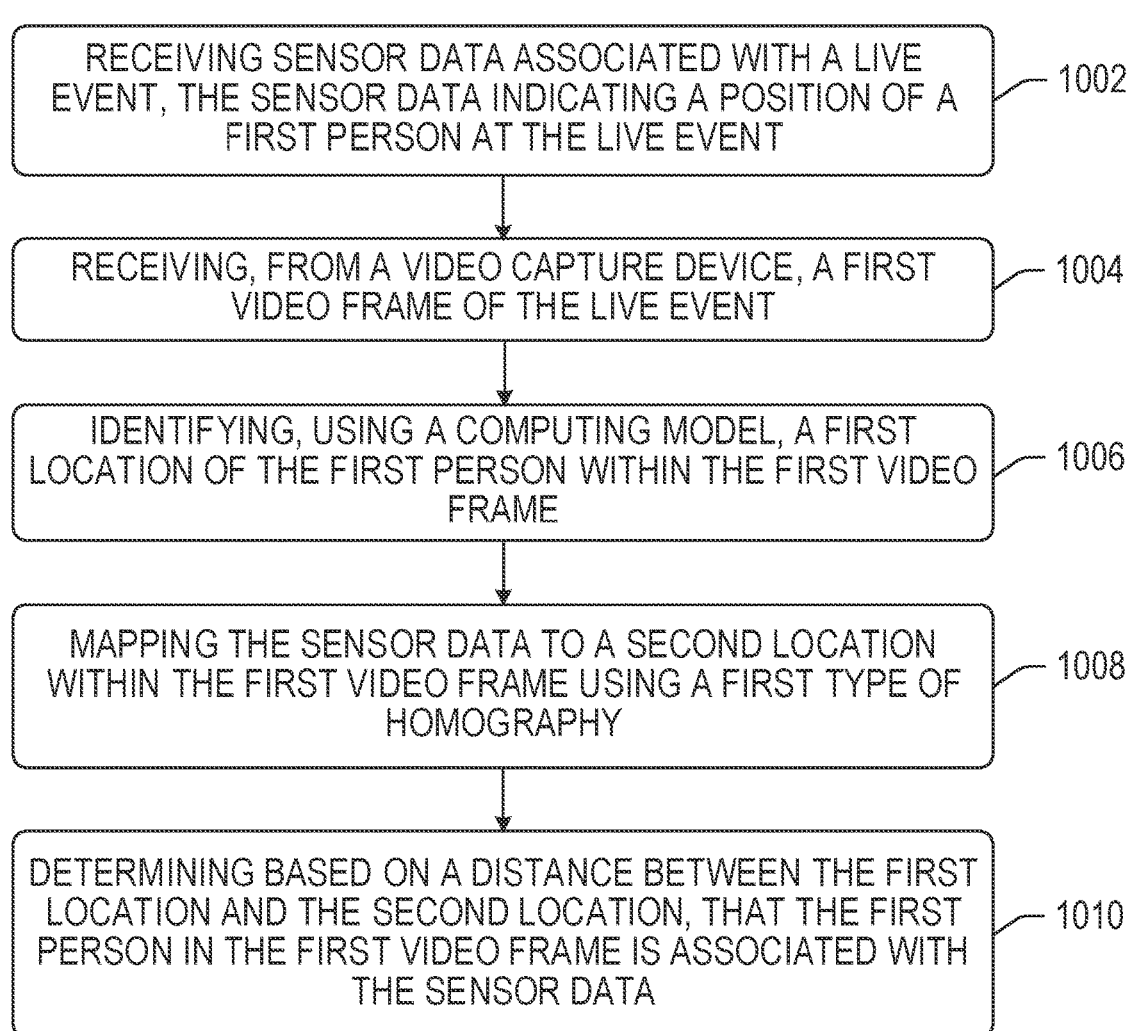

RECEIVING SENSOR DATA ASSOCIATED WITH A LIVE EVENT, THE SENSOR DATA INDICATING A POSITION OF A FIRST PERSON AT THE LIVE EVENT — 1002

RECEIVING, FROM A VIDEO CAPTURE DEVICE, A FIRST VIDEO FRAME OF THE LIVE EVENT — 1004

IDENTIFYING, USING A COMPUTING MODEL, A FIRST LOCATION OF THE FIRST PERSON WITHIN THE FIRST VIDEO FRAME — 1006

MAPPING THE SENSOR DATA TO A SECOND LOCATION WITHIN THE FIRST VIDEO FRAME USING A FIRST TYPE OF HOMOGRAPHY — 1008

DETERMINING BASED ON A DISTANCE BETWEEN THE FIRST LOCATION AND THE SECOND LOCATION, THAT THE FIRST PERSON IN THE FIRST VIDEO FRAME IS ASSOCIATED WITH THE SENSOR DATA — 1010

FIG. 10

SYSTEMS AND METHODS FOR THE PRESENTATION OF GRAPHICAL OVERLAYS

BACKGROUND

Systems exist that enhance the viewing experience for live as well as on demand content, which may include, for example, various sporting events. During live games, the system receives data across multiple modalities such as video, audio, and metadata. This metadata stream includes granular information regarding all of the chronological proceedings in the play, such as key players involved, all events occurring, dynamic statistics about the play events and players, sensor data based on-ground positions of the players and the ball, etc. This information can be utilized to display engaging information to the viewers of the live event as the play proceeds in real-time. To accomplish this, there needs to be temporal synchronization across all relevant modalities. However, the sources of these data streams are disparate and there may be a lack of temporal synchronization across the data sources due to the absence of any common timestamp or marker which can be utilized to align the time stamps of the data sources. Additionally, the temporal drift across the data sources is dynamic and changes over time, posing further challenges.

In addition to challenges posed by temporal synchronization of multiple modalities, automatic player identification and tracking using computer vision algorithms is a challenging task. The players appear too small within the video stream to be identified visually. Tracking players is also often hindered by occlusion and motion blur.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may depending on the context, encompass a plural number of such components or elements and vice versa.

FIGS. 5A-7D depict further example use cases for player identification and tracking in accordance with one or more example embodiments of the disclosure.

FIG. 9 depicts an example method for temporal synchronization of multimodal data streams in accordance with one or more example embodiments of the disclosure.

FIG. 10 depicts an example method for player identification and tracking in accordance with one or more example embodiments of the disclosure.

DETAILED DESCRIPTION

This disclosure relates to, among other things, systems and methods for the presentation of graphical overlays. Particularly, the systems and methods may be used for displaying graphics over live broadcasts being viewed by an audience. Such graphics may be presented in real-time as the live events are unfolding during the broadcast or may be presented over replays of the events that are broadcasted after the live events already took place.

Figure 2:
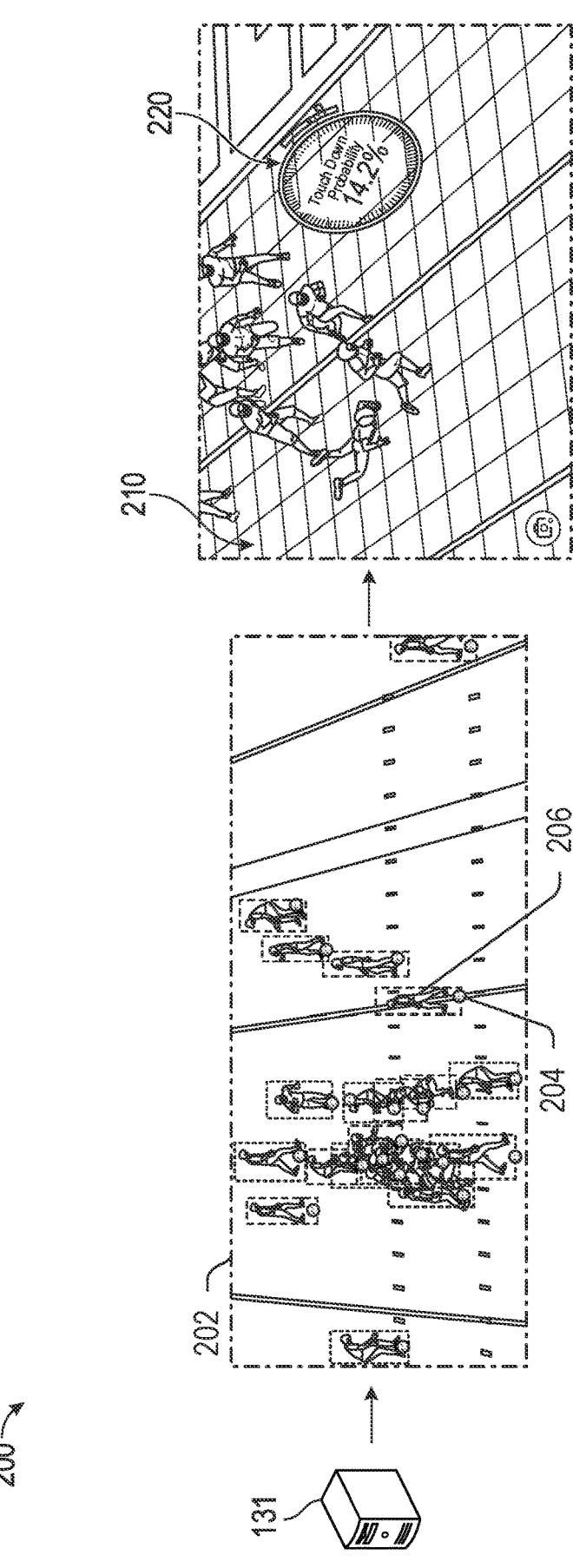
FIG. 2 depicts an example use case for player identification and tracking in accordance with one or more example embodiments of the disclosure.

As one non-limiting example use case of the systems and methods described herein, live sports broadcasts may display a wide variety of graphics identifying key players involved in a particular play. These graphics help improve the engagement of the viewers by enabling better comprehension of the game. As compared to the in-stadium viewing experience, in quite a few cases, it may be difficult to understand the game strategies and proceedings while viewing the game on a smaller screen. The graphics enhance the viewer's understanding of the game by highlighting key players, on-field landmarks, and key moments in the game, for example. As an example, American football broadcasts currently include a "first down" graphic which, with the help of three-dimensional (3D) modeling algorithms and camera hardware, augments the viewing experience by adding a yellow line at a first down location on the field. As another example, a graphic providing information about a play may be presented as an overlay of a replay of the play that is presented after the play has ended (an example is shown in FIG. 2). During a live game, low latency and high accuracy are essential for the graphics to capture viewer attention to the fullest, and computer vision algorithms play an important role in achieving these goals.

The approach described herein addresses at least two challenges associated with the presentation of such graphics: (1) performing time synchronization when multiple data sources (for example, the video feed of the sporting event and data captured from sensors provided on the players, equipment, field, etc.) are used to generate and present the graphics and (2) effectively identifying and tracking individual players in the video feed of the live event. The terms "feed" and "stream" may be used interchangeably herein to refer to the video and/or audio content captured at the live event (for example, by one or more cameras provided at the live event as shown in at least FIGS. 1 and 11).

With the advent of embedded sensors in player wearables and equipment, various auxiliary information streams are available directly from the playing field. These sensors provide play metadata such as the nature of play, players on the field, the positions of the players on the field, ball locations, etc. These data streams in conjunction with computer vision algorithms may play a role in creating viewer-engaging graphic visualizations with very low end-to-end delivery time. For example, in the case of American football, Radio Frequency Identification (RFID) sensors embedded in the ball and player equipment provide a continuous data stream of two-dimensional (2D) coordinates of the entities on the playing field. Such information can augment the computer vision algorithms to display information such as a player route during a play or animated graphics tracking key player locations on-screen and detection of play formations, for example. Any other types of sensors may also be used as well.

Using this combination of different data streams (the video and audio stream of the game as well as the data being captured by the sensors (and/or other information included in the metadata), for example) may pose time synchronization challenges. For example, the sensor data may be received earlier than the video/audio stream given that the video/audio stream may undergo additional processing, such as encoding and decoding, etc. Thus, sensor data may need to be temporally synchronized with the video/audio stream such that the data may be properly correlated to the events being shown in the video stream. For example, if it is desired to display a graphic including information about a specific player after a play has completed, then the portion of the sensor data that is relevant to the player and the play may need to be time synchronized with the video stream to ensure that the correct information from the metadata is associated with the play being shown on the broadcast.

To ensure proper temporal synchronization between the different data streams (for example, the video stream and the sensor data), a visual event detection-based method may be used. Using one or more event detection computer vision models (or any other type of artificial intelligence, such as machine learning, deep learning, neural networks, etc.), unique events may be identified in the video stream. Such events are visually distinct and may be reliably identified by the model(s). The model(s) may be trained and customized in such a way that the prediction accuracy for the events may only require a few video frames to identify the event. Once an event is identified, a time stamp associated with the frame including the event may be matched with the time stamp reported in the sensor data, which is usually available before the video stream is received. Once the event from the video stream is matched with the event provided in the metadata, the two data sources may be time synchronized.

In some instances, the frequency of the two streams may also be different. For example, the video stream may be presented at 30 frames per second while the metadata may be received at 10 Hz. In such cases, data may be interpolated across video frames to accurately predict the frame-level information.

As an example of time synchronization, an event that may be used in the case of American football is snapping the ball to initiate an offensive play. An action recognition-based event detection ensemble model (for example) may be used to predict the occurrence of the snap event (for example, predict if a snap event has occurred in a given video frame). Based on this prediction, the sensor data may be synchronized with the video stream and may be used to automatically create graphics to highlight important players in a replay clip (or any other type of graphics).

In one or more embodiments, a game clock detector using optical character recognition (OCR) technology may also be used. The game clock detector interprets the clock and score information displayed in each video frame for any sport. Based on this information, the metadata information may be synchronized information, which provides accurate time stamps for events happening in the game.

In addition to time synchronization challenges, there also exist challenges with identifying and tracking players shown within the video stream. Traditionally, graphics are created with extensive manual annotation for post-match analysis and take a significant amount of time to be generated for presentation. To create such visualizations in near real-time, automatic on-screen player identification and localization may be used. However, such identification and localization present a challenging vision problem, especially for sports such as American football where the players wear elaborate protective equipment.

Automatic identification of players is a challenging problem in large field multiplayer sports. One potential approach is to perform player identification by detecting and recognizing the team and jersey number of individual players from the appearance of their jerseys. In the case of sports where the players are not wearing protective gear, such as soccer and basketball, facial and appearance features can be used to identify the players. For American football and ice hockey, the protective gear worn by the players makes it visually challenging to distinguish between players from the same team.

To account for these difficulties, the approach described herein may involve first identifying individual players within a given video frame (for example, using any suitable computer vision techniques). A smaller portion of the player or equipment worn by the player (such as a helmet worn by the player or the head of the player, for example) may then be tracked to track the movement of the player across various video frames forming a video stream of the live event.

Additionally, as aforementioned, the metadata may include player positional data. That is, the metadata may include positional data captured by sensors provided within equipment worn by the players on the field (such as the RFID tags). This data may be used to generate any graphics that are displayed over the broadcast of the live event. However, it may not be known which player in the video frame is associated with a given data point included within the metadata. Thus, player identification and tracking may also involve synchronizing positional data included in the metadata with the positions of the players shown in the video frames.

In one or more embodiments, the positional data may be mapped to a two-dimensional (2D) plane showing the relative positions of the players on a 2D representation of the game field. For example, one or more data points representing the determined positions of the players according to the sensor data are shown on the 2D plane. This sensor data, however, may need to be mapped to the player locations shown in the video frame (for example, data point captured by a sensor within equipment worn by player may need to be matched with the player shown in the video frame).

In one or more embodiments, this mapping may be performed using a homography. Generally, a homography is a transformation used to map a plane to another plane. Once sensor data associated with one player is mapped to the player shown in the video frame using the homography, the data may be used to generate graphics about the player. For example, a graphic may be generated and presented that points to a specific player shown in the video stream that provides statistics about the player.

Some computer vision methods may estimate the homography by identifying sports specific on-field landmarks which are used as keypoints to estimate the homography. Some approaches, which rely on classical computer vision use techniques, such as Hough transforms, involve camera calibration challenges. Some more recent approaches use different deep learning techniques to either identify these keypoint features or to directly regress homography matrix parameters. Most of these approaches rely in some way on the field markers and might struggle in scenarios where these are sparse or missing. This often happens when the camera zooms in on the players in a small part of the field which is away from the edges. Some approaches try to propagate homography between consecutive frames when manual initialization is available for a few frames. These methods can be used to overcome challenges related to less visibility of markings but even they need the stretch of frames with low confidence results to be short. There are some existing approaches which rely on human workers or special expensive camera and/or other hardware equipment to estimate the camera pose.

In contrast to other methods which rely on field markings, the method described herein more effectively handles poor field landmark visibility. The method provides for fully automatic on-screen player localization and identification utilizing the auxiliary data stream providing on-field player locations collected via RFID tags (and/or other types of sensors) included in equipment (e.g., shoulder pads or other types of equipment) worn by players. The method first performs field registration by estimating a perspective transformation from the ground plane to the display frame and then utilizes helmet tracking that is performed using a trained model, fine-tuned on an helmet dataset, to perform player localization and identification. Unlike the conventional methods for field registration, this method may not depend on the identification of salient on-ground landmarks and/or key-points and mapping them to corresponding points on a ground template to estimate the image to template transformation. Although the method may be described herein with respect to American football, the method may be extended to other sports as well.

Figure 1:
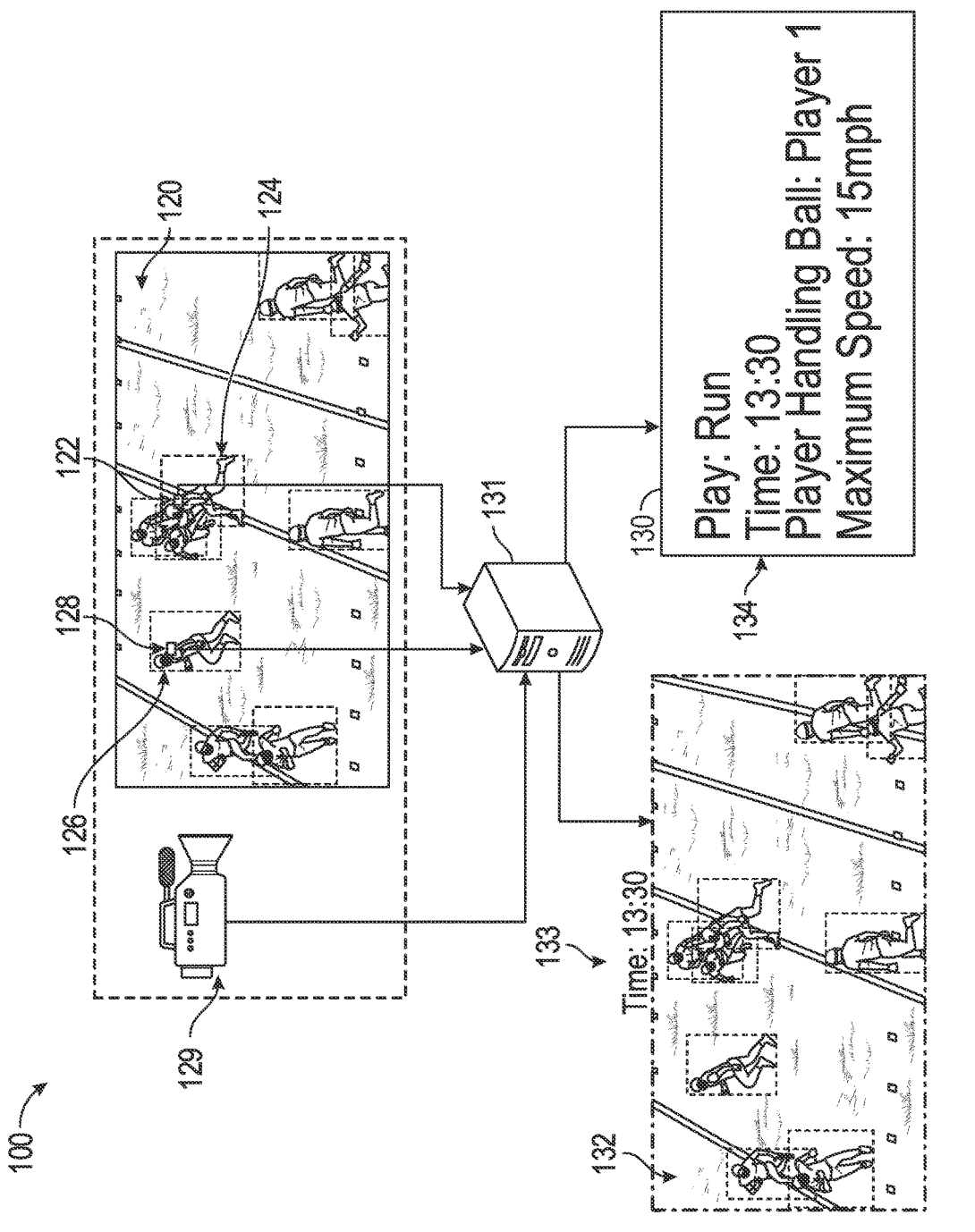
FIG. 1 depicts an example use case for temporal synchronization of multimodal data streams in accordance with one or more example embodiments of the disclosure.

Referring to FIG. 1, an example use case 100 illustrating one facet of generating and presenting graphics (temporal synchronization of multimodal data streams) is shown. The use case 100 shows a live event 120 (in this use case, the live event is an American football game) that is being broadcasted to various viewers in real-time. For example, one or more cameras 129 may be provided at the live event 120. The one or more cameras 129 may capture video and/or audio feed of the live event 120 such that the live event 120 may then be broadcasted to viewers. In this manner, the viewers may watch the live event from a device (for example, a television, laptop or desktop computer, tablet, etc.) without being physically present at the game. The video and/or audio captured by the one or more cameras 129 may represent a first source of data relating to the live event 120.

The use case 100 also shows that one or more sensors are provided at the live event 120 to capture data about players, plays being made by the players, and/or any other different types of relevant information. In one or more embodiments, the one or more sensors may be provided in equipment of the players (for example, the figure shows a first sensor 122 embedded within shoulder pads of a first player 124 and a second sensor 128 embedded within shoulder pads of a second player 126). Additional sensors may also be provided with equipment used during the live event 120, such as a football being carried by the first player 124. Sensors may also be provided at various locations along the field of player, such as at the end zones and/or any other location.

The data captured by the sensors may form a second source of data relating to the live event 120. This second data source may form the "metadata" as described herein. Metadata 130, for example, shows information including an indication of an event that is occurring (a run play), a time stamp 134 associated with the event, an indication of the player carrying the ball during the run play, and an indication of a maximum speed achieved by the player during the play. The sensor data may be combined with other sources of information, such as annotations that are manually provided by one or more users (for example, a user may manually provide supplemental information about players, events occurring at the time the data was captured, etc.). The metadata may also include other information that is automatically added. The metadata 130 shown in the figure only shows some of the information that may be compiled for a single event. This is merely an example of certain types of information that may be included in the metadata 130. The metadata 130 may also include information about any other events occurring throughout the game, as well as any other types of relevant data.

The information included in the metadata 130 may be used for a number of purposes, including at least generating graphics that may be presented over the broadcast of the live event 120 that is being viewed by the viewers. For example, FIG. 2 shows a graphic 220 indicating the probability that a team in offensive possession of the football will score a touchdown during the given play. Any other types of graphics may also be displayed however, such as the maximum speed of the player during the play, names of the players involved in the play, statistics associated with the players, statistics associated with the teams, and/or any other types of information.

However, given that multiple different data sources are involved in the generation of the graphics, the data sources may not necessarily be time synchronized. To ensure that the different data sources are time synchronized, the data from the different data sources may be provided to a computing device 131 for processing. The computing device 131, for example, may be a remote server or any other type of device (or system) including processing capabilities. For example, the computing device 131 may be computing device 110, computing device 1110, computing device 1200, etc. To perform the time synchronization, the computing device 131 may perform event detection using the video and/or audio feed captured by the one or more cameras 129. Using one or more event detection computer vision models, unique events may be identified in the video stream. Such events are visually distinct and may be reliably identified by the models. The models are trained and customized in such a way that the prediction accuracy for the events may only require a few video frames to identify the event. Once an event is identified, a time stamp associated with the frame including the event may be matched with the time stamp 134 reported in the sensor data, which is usually available before the video stream is received. The method for performing time synchronization is described in additional detail with respect to at least FIG. 3.

FIG. 2 depicts an example use case 200 illustrating another facet of generating and presenting graphics, which is player identification and tracking. Player identification and tracking may be used to correlate sensor data (and or data) included within the metadata with the information depicted in the video frames (an example video frame 202 is shown in FIG. 2) that form the video stream of the live event. This data may be used to generate any graphics (such as graphic 220 shown in FIG. 2) that are displayed over the broadcast 210 of the live event. However, it may not be known which player in the video frame is associated with a given data point included within the metadata. Thus, player identification and tracking may also involve synchronizing positional data included in the metadata with the positions of the players shown in the video frames.

Figure 6A:
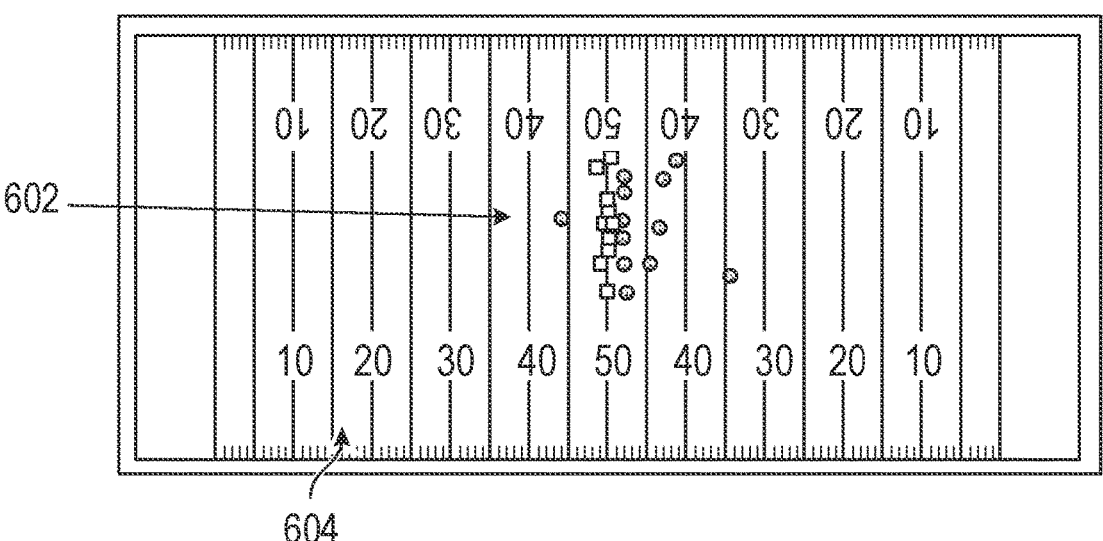
Figures 7A, 7B, 7C, 7D:
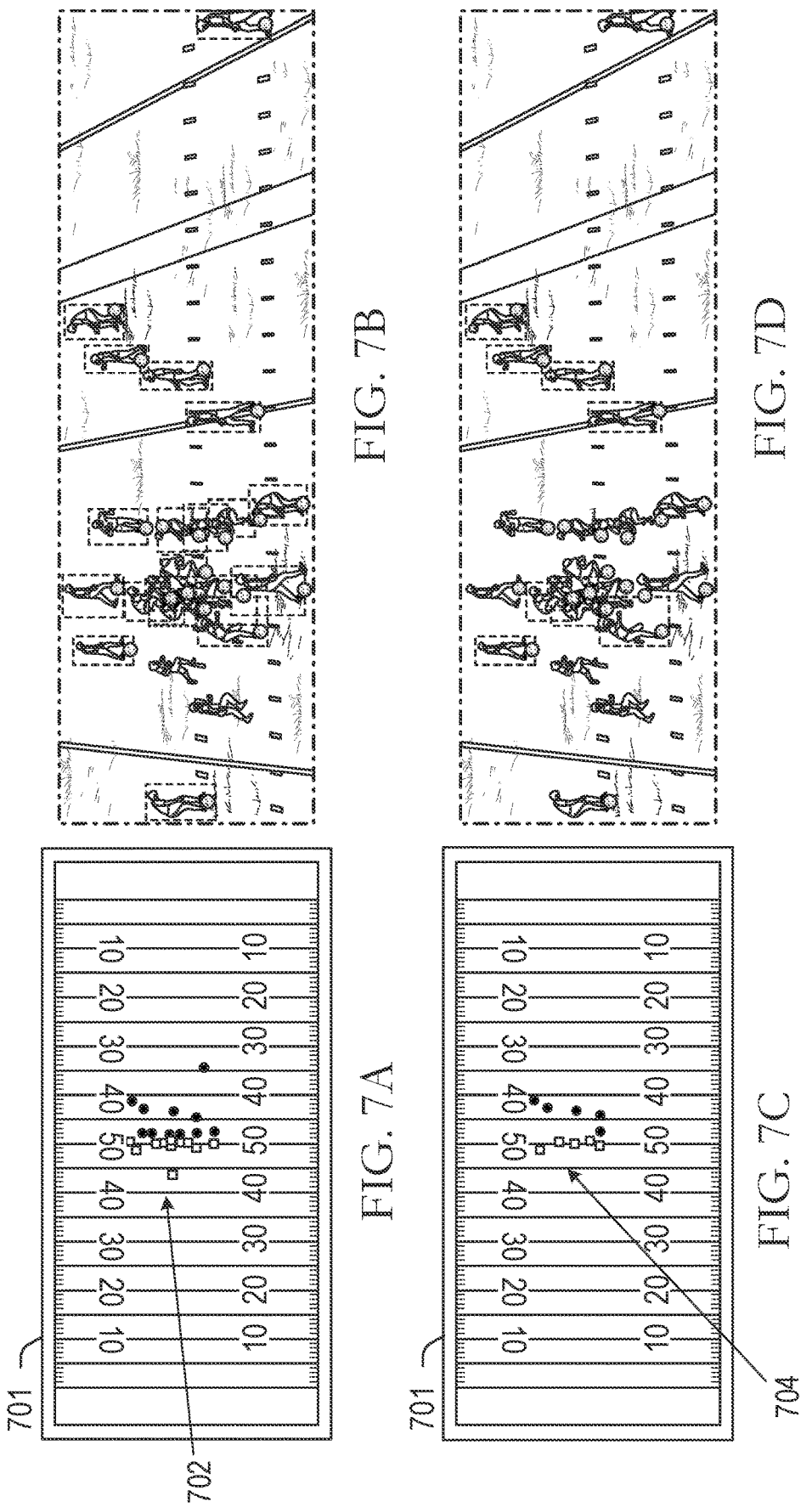

In one or more embodiments, the positional data may be mapped to a two-dimensional (2D) plane (an example is shown in FIGS. 6A, 7A, and 7C) showing the relative positions of the players on a 2D representation of the game field. For example, one or more data points representing the determined positions of the players according to the sensor data are shown on the 2D plane. This sensor data, however, may need to be mapped to the player locations shown in the video frame (for example, data point captured by a sensor within equipment worn by player may need to be matched with the player shown in the video frame).

In one or more embodiments, this mapping may be performed using a homography. Generally, a homography is a transformation used to map a plane to another plane. The result of the homography may be another set of data points shown within the video frame 202 that may then be associated with players shown in the video frame 202. For example, mapped data point 204 is shown as being associated with player 206. Further details about the method for performing this player identification and tracking are provided with respect to at least the flow diagram 400 of FIG. 4.

Once the player and helmet tracking is performed and the metadata is associated with the information depicted in the video frame 202, one or more graphics may be generated and presented within a live broadcast 210 of the sporting event. For example, the use case 200 shows a graphic 220 depicting a percentage probability that a team in offensive possession of the football is going to score a touchdown during the offensive play. This is merely one example of a type of graphic that may be generated and presented and any other graphic or graphics may also be generated and presented as well.

Figure 3:
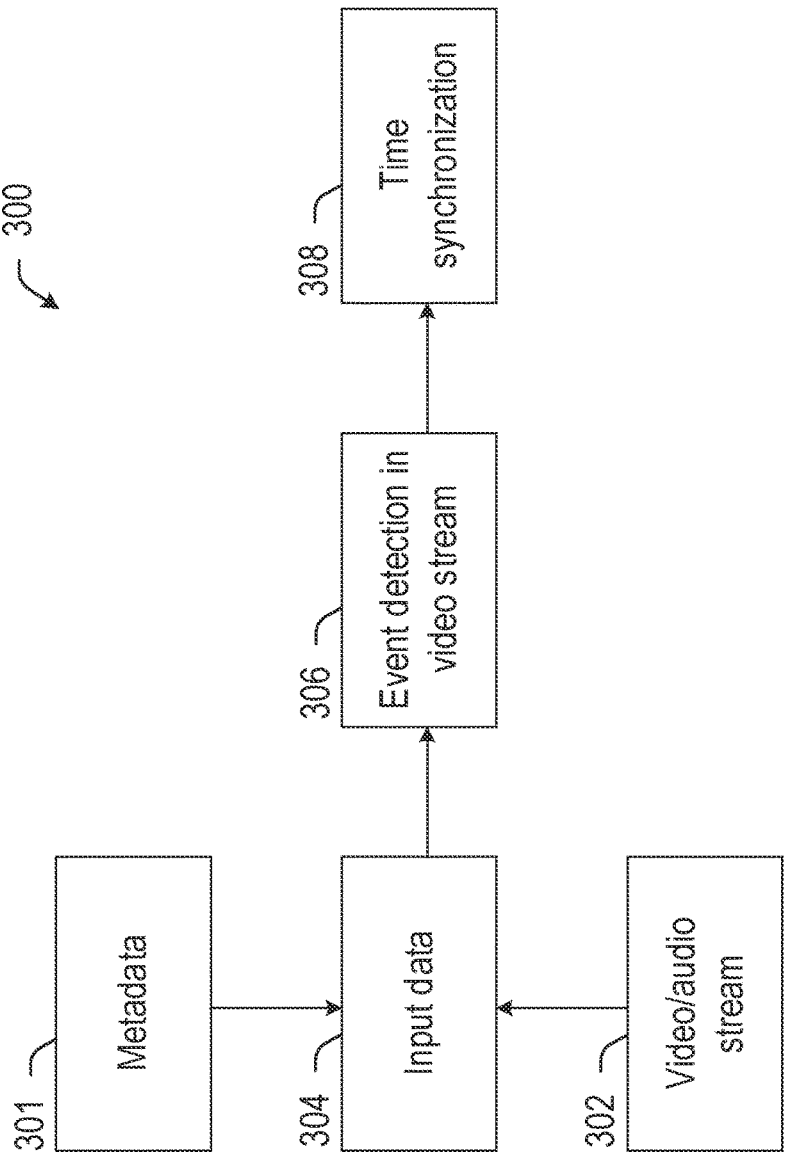
FIG. 3 depicts an example flow diagram for temporal synchronization of multimodal data in accordance with one or more example embodiments of the disclosure.

FIG. 3 depicts an example flow diagram 300 for temporal synchronization of multimodal data in accordance with one or more example embodiments of the disclosure.

Operation 304 involves receiving input data. In one or more embodiments, the input data may include at least metadata 301 (which may be the same as metadata 130 and/or any other metadata described herein or otherwise) and a video/audio stream 302. The metadata 301 may include data captured by sensors provided at the live event being broadcasted to viewers through the video/audio stream 302. For example, if the live event is an American football game, various sensors may be provided within the equipment of the players on the field, equipment of the game (e.g., a football, etc.), at various positions on the field, and/or any other location. The information included in the sensor data may include, for example, names and positions of players included within a play, the location, speed, and direction of travel (and/or information about any other movement patterns) of the players and/or game equipment (such as the football), etc.

The metadata 301 may also include information beyond the sensor data as well. For example, the metadata 301 may include manual annotations provided by users. This may include supplemental information that is not captured in the sensor data. The information may also include indications of on-field events, such as a snap of the ball, a pass being initiated, a pass being caught, a touchdown occurring, etc. In some instances, the events may be automatically detected based on the sensor data. For example, data captured from a position sensor embedded in or on the football may be used to determine that the football has moved and a snap play has been initiated. However, this and other information may also be added to the metadata 301 manually by a user as well. The metadata 301 may also be timestamped to provide a temporal frame of reference for times at which data was captured from the various sensors, events were detected, etc. The metadata 301 may also include any other types of information described herein or otherwise as well.

The video/audio stream 302 may include the video and/or audio of the live event that is captured and broadcast to various viewers. Continuing the example of the American football game, one or more cameras may be included in a stadium in which the game is played. The cameras may capture video and/or audio feed of the game occurring on the field and broadcast to the viewers in real-time. A viewer may view the live broadcast of the game through a streaming service, a cable television channel, and/or in any other suitable manner.

However, given the manner in which the metadata 301 and video/audio stream 302 are processed and transmitted, there may exist a temporal desynchronization between the two sources of data. To synchronize these two data sources such that the information in the metadata 301 may then be correlated with the live action being shown in the video/audio stream 302, event detection may be performed with the video/audio stream 302 to identify when certain events occur within the video/audio stream 302. For example, event detection may be performed to identify the occurrence of a "snap event" (e.g., when a football is snapped to initiate an offensive play). However, event detection may be used to identify any other type of event as well. For example, the initiation of a pass or run by a player, a tackle of a player, and/or any other type of event. The live event may not necessarily be a sports game, so the event that is detected may not necessarily be limited to a sports play as well. Once the event is identified, the video/audio stream 302 may be temporally synchronized with the metadata 301 by determining the timestamp of the same event within the metadata 301.

As such, operation 306 may involve performing event detection using the video/audio stream 302. As the video/audio stream 302 is captured (for example, using the cameras provided at the live event, such as the football game), the video and audio data may be processed by a system (such as a remote server, for example) to perform the event detection. The system may include a computing model (a "computing model" may refer to any type of artificial intelligence, such as machine learning, deep learning, neural networks, etc.) that is trained to perform the event detection. Any reference to any specific type of model herein is not intended to be limiting and any other model may similarly be used.

In one or more embodiments, the computing model may more specifically be a deep learning action recognition model. The model may also employ a temporal shift model to provide an understanding of the time dimension of data. The model not only processes information included in a selected frame of the video (referred to as a "central frame"), but also processes information in a number of frames located before or after each central frame to capture temporal correlation across frames.

The model may also be trained using historical data. To perform this training, video frames that were previously captured may be manually annotated by a user to indicate a particular type of event that is shown in a video frame. An indication of the event that is occurring may also be provided to the model in any other suitable manner. This manually-annotated data may be used to train the model to be able to identify the same type of event in a video stream that is captured in real-time. For example, a video frame showing the imitating of a "snap event" may be provided to the model along with a manual indication that the video frame shows the initiation of the snap event. The model may then be trained to more effectively identify snap events in subsequent video frames based on the video frame provided during training. The model may be trained in this manner using any number of video frames, and a similar approach may be used to train the model to recognize any other type of event.

The model may also be iteratively trained over time. Even after the model is deployed for use in performing event detection in real-time during live events, the data that is captured and processed in real-time may be used to further train and improve the effectiveness of the model in performing event detection.

Additionally, multiple different models may be used in parallel. Each of the different models may include a different temporal window. For example, a first model may use a window of seven frames, a second model may use a window of 15 frames (e.g., 15 frames on either side of each central frame), and a third model may use a window of 25 frames. The outputs of each of the models may be combined to produce an overall probability value. An event may then be identified in the central frame if the probability value associated with the frame satisfies a threshold value. For example, if the probability is greater than 50% (or any other threshold), then it may be determined that the event has occurred in the frame.

The determination that the event is occurring in the video frame may also be made using the multiple models in other ways as well. For example, rather than combining the outputs of the three models and then determining if a final probability value is greater than a threshold value, it may be determined if all of the probability values produced by the multiple models surpass the given threshold. Any other type of statistical analyses may also be used, such as determining if a mean of the probabilities surpasses the threshold, etc.

Finally, operation 308 involves performing the time synchronization. Once it is determined that an event is detected within a given video frame, the same event may be identified within the metadata. Given that the metadata also includes time stamps associated with events listed within the metadata, this time stamp may be used to synchronize the video frame showing the event with the event included in the metadata.

Additionally, once one video frame is time synchronized with the metadata, additional video frames may also be time synchronized based on the frequency of the various data sources. For example, the video frames may be shown at a frame rate of 30 frames per second (fps) and the metadata stream may be provided at a frequency of 10 Hz, then every third video frame may be synchronized with corresponding metadata.

Figure 4:
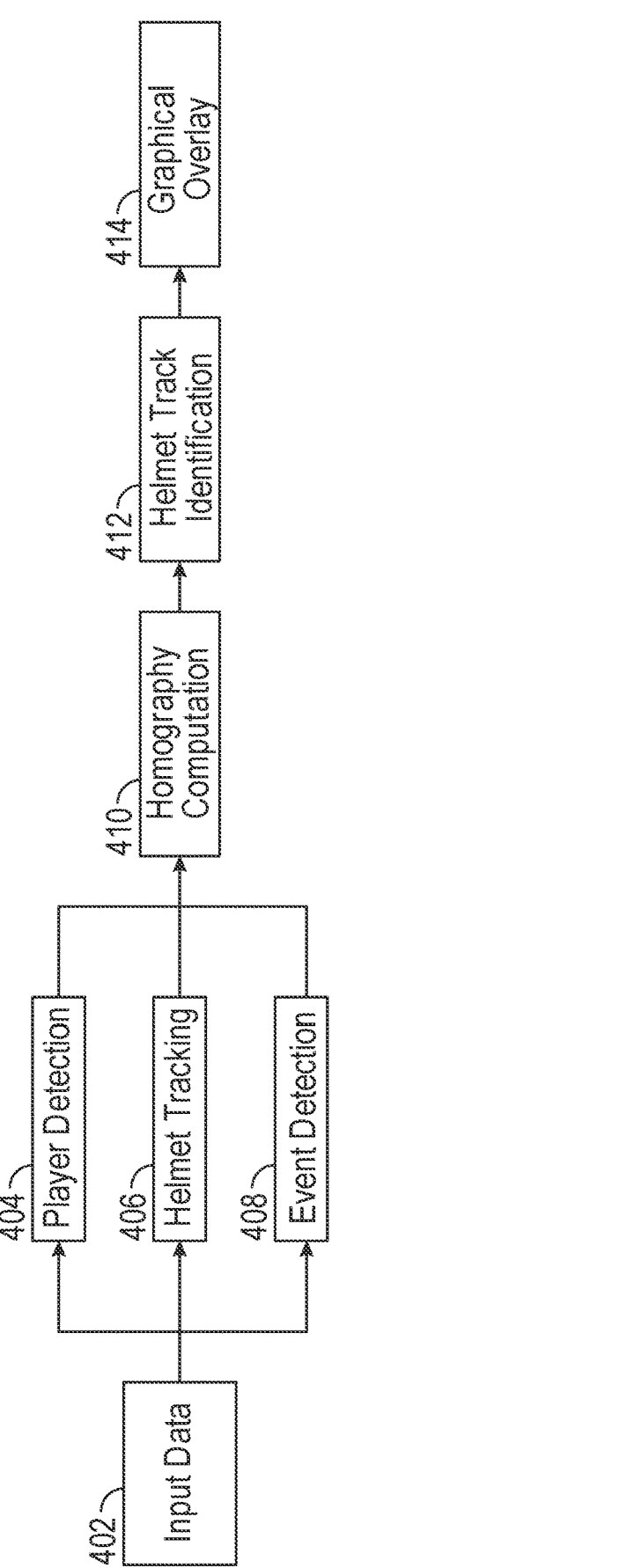
FIG. 4 depicts an example flow diagram for player identification and tracking in accordance with one or more example embodiments of the disclosure.

FIG. 4 depicts an example flow diagram 400 for player identification and tracking. Player identification and tracking may involve identifying and tracking players within one or more video frames captured for the live event. Additionally, player identification and tracking may also involve synchronizing positional data included in the metadata with the positions of the players shown in the video frames. That is, the metadata may include positional data captured by sensors provided within equipment worn by the players on the field (such as the RFID tags). However, it may not be known which player in the video frame is associated with a given data point included within the metadata.

As shown in FIG. 6A, the positional data included within the metadata may be mapped to a two-dimensional (2D) plane 604 showing the relative positions of the players on a 2D representation of the game field. For example, one or more data points 602 representing the determined positions of the players according to the sensor data are shown on the 2D plane 604. This sensor data, however, may need to be mapped to the player locations shown in the video frame (for example, data point 606 captured by a sensor within equipment worn by player 608 may need to be matched with the player 608 shown in the video frame 610). Once sensor data associated with one player is mapped to the player shown in the video frame, the data may be used to generate graphics about the player. For example, a graphic may be generated and presented that points to a specific player shown in the video stream that provides statistics about the player.

Figure 5A:
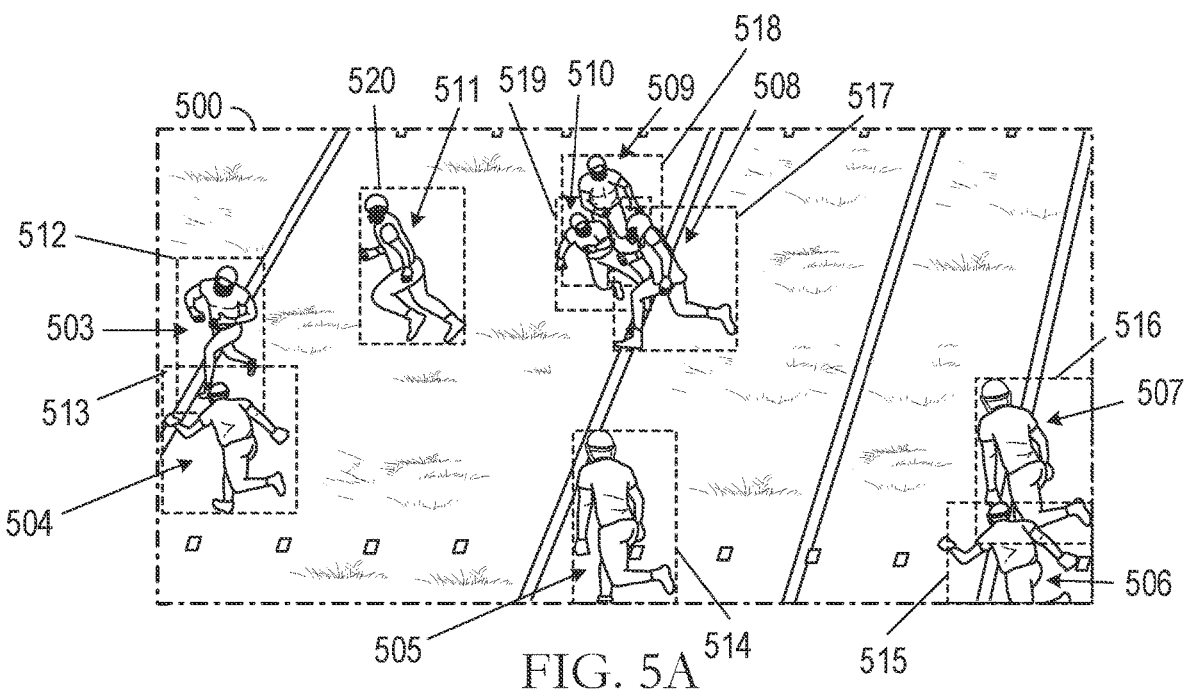
Figure 5B:
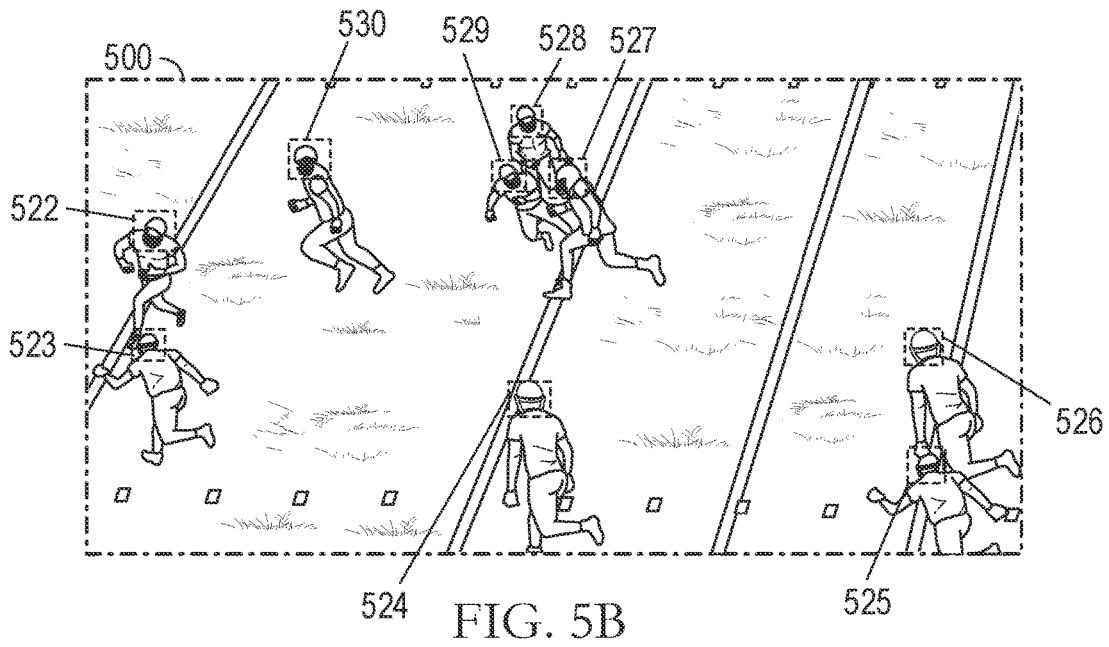
Figure 6B:
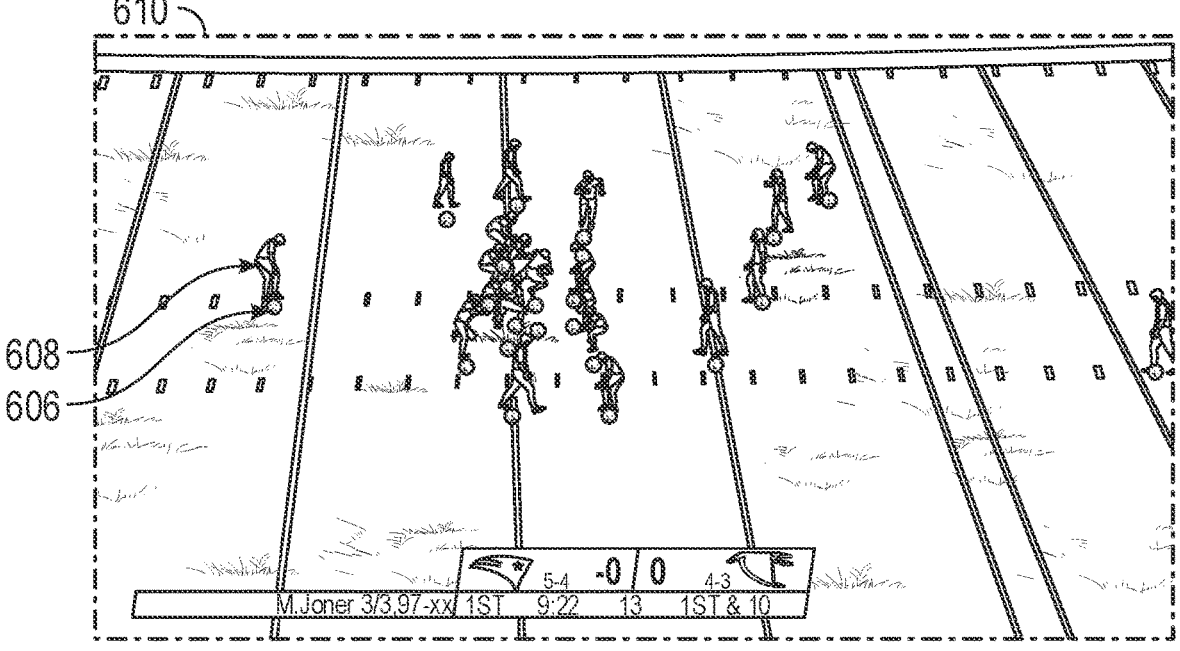

Upon receiving an input set of video frames associated with the video stream of the live event, one or more modules may be triggered to synchronize the data streams and extract visual information. An event detection module predicts the frame in which an event (for exemplary purposes, a snap event for an American football game may be used, however, this is not intended to be limiting) occurs in the video stream (for example, identifies one or more video frames in which the event is occurring). The player detection module provides player detection bounding boxes (e.g., as shown in FIG. 5A) for each frame and the helmet detection and tracking module tracks player helmets as bounding box tracks (e.g., as shown in FIG. 5B). The metadata may be used to identify players in the snap frame predicted by the event detection module. Player matching across positional data included in the metadata and players detected in the video frame may be performed using a homography or perspective transformation (for example, computed by the homography computation module), mapping metadata on-field coordinates to points within the video frame. Such a player mapping is shown in FIG. 6B. The helmet track identification module finds an on-screen player helmet track for a mapped point on the ground plane. The matched helmets can be tracked across frames using helmet tracking.

In some scenarios, such as helmet tracking failures and player exiting or re-entering the frame the homography may be recomputed for subsequent player identification. The proposed homography computation module can be re-used but at the cost of significant added latency. To handle such cases, low latency methods may be used to extend the homography across a series of frames. One example approach is using the known location of a player's helmet in one frame to produce a new homography in subsequent frames. Another example approach is to attempt to match points across video frames.

Turning to the operations of the flow diagram 400, operation 402 involves receiving input data. In one or more embodiments, different types of data may be received from multiple data sources.

As aforementioned, a first source of data may be the video and/or audio feed of the that is broadcasted to viewers. If the live content being broadcasted is a sporting event, then this first source of data may be the video and/or audio of the sporting event that is presented to a viewer via a device such as a television, a smartphone, a tablet, etc. For example, one or more cameras may be provided at the live event that may capture video and/or audio of the live event that may then be broadcasted to the viewers who are not located at the live event.

A second source of data may include metadata. The metadata may include data received from various sensors that are provided at the live event. For example, in American football games, sensors may be provided within the equipment worn by the players on the field. Sensors may also be provided in the ball, at various locations on or proximate to the field, and/or at any other location. In one or more embodiments, the sensors may be RFID tags, accelerometers, and/or any other types of sensors that may be used to capture information about the players, the events taking place, etc. The metadata may also include any other type of information described herein or otherwise.

Operation 404 involves performing player detection. Player detection involves identifying distinct players within a given video frame such that the location of the players and the actions performed by the players may be tracked across subsequent video frames (for example, players and actions may be tracked over time).

FIG. 5A shows an example video frame 500 including a number of players and bounding boxes that are provided around the players as part of player detection. For example, the video frame 500 includes a first player 503, a second player 504, a third player 505, a fourth player 506, a fifth player 507, a sixth player 508, a seventh player 509, an eighth player 510, and a ninth player 511. A first bounding box 512 is shown around the first player 503, a second bounding box 513 is shown around the second player 504, a third bounding box 514 is shown around the third player 505, a fourth bounding box 515 is shown around the fourth player 506, a fifth bounding box 516 is shown around the fifth player 507, a sixth bounding box 517 is shown around the sixth player 508, a seventh bounding box 518 is shown around the seventh player 509, an eight bounding box 519 is shown around the eighth player 510, and a ninth bounding box 520 is shown around the ninth player 511. That is, FIG. 5A visualizes a manner in which the players may be identified within the video frame 500.

Operation 406 involves performing object tracking. Once the individual players are identified within a video frame, a specific object associated with the player may be used to track the player through a series of video frames forming the video stream. For example, in the case of an American football game, player helmets may be tracked rather than tracking the entire body of the player. Detection and tracking of players and helmets in American football is challenging due to excessive occlusions and motion blur (caused by sudden directional changes of both players and camera). An object such as a helmet may be tracked instead of tracking the entire body of the player (for example, using the bounding boxes shown in FIG. 5A) because the helmets are smaller in size and less impacted by occlusion and/or motion blur. However, this is not intended to be limiting and any other object may be used to track the individual players as well. In some instances, portions of the bodies of the players may also be used. For example, in a soccer match in which player equipment is limited or non-existent, the players may be tracked using their heads rather than helmets.

FIG. 5B shows an example video frame 530 including a number of players and bounding boxes that are provided around the helmets of the players. For example, the video frame 530 includes players 503-511 (which may be the same players depicted in FIG. 5A) and bounding boxes 522-530 provided around the helmets of players 503-511. Once the players and helmets (and/or any other object that is being used for tracking purposes) are identified, the movement of the helmets may then be tracked across the various video frames to track the changing location of the players.

In one or more embodiments, a low latency yet accurate fine-tuned model, such as Scaled-YOLO (as a non-limiting example), may be used for both player and helmet detection. In one or more embodiments, a pre-trained data association based DeepSORT algorithm may be used for helmet tracking. The algorithm may use detected bounding boxes as input and tracks the helmets using a Kalman filter based motion model and deep appearance features. However, this is merely one non-limiting approach.

Operation 408 involves performing event detection. Event detection may involve identifying whether a particular type of event is occurring within a given video frame. For simplicity, the example of a ball snap in an American football game is used, however, the same event detection approach may be applicable to any other type of event that may occur in the American football game (or any other type of event that may occur in the particular type of live content being broadcasted).

Similar to event detection performed for time synchronization as described with respect to FIG. 3, a computing model, such as a deep learning action recognition model that is trained using prior video frames including the event, may be used. The model may also employ a temporal shift model to provide an understanding of the time dimension of data. Further, multiple different models, each with different temporal windows, may be used in parallel. The outputs of each of the models may be combined to produce an overall probability value. An event may then be identified in the central frame if the probability value associated with the frame satisfies a threshold value. For example, if the probability is greater than 50% (or any other threshold), then it may be determined that the event has occurred in the frame.

Operation 410 involves performing a homography computation. Once the event detection is performed in operation 308, the bounding boxes for the players are identified in operation 304, and the helmet tracks along with the snap frame information in operation 306, a perspective transform may be performed from the 2D metadata plane 701 to the video frame in which the event is identified. A perspective transform represented by a 3×3 matrix has eight degrees of freedom and relates the points between two planes (up to a scale factor):

$$s\begin{bmatrix} x' \\ y' \\ 1 \end{bmatrix} = H\begin{bmatrix} x \\ y \\ 1 \end{bmatrix} = \begin{bmatrix} h_{11} & h_{12} & h_{13} \\ h_{21} & h_{22} & h_{23} \\ h_{31} & h_{32} & h_{33} \end{bmatrix}\begin{bmatrix} x \\ y \\ 1 \end{bmatrix}$$

There are nine parameters, but the matrix has eight degrees of freedom because it may generally be normalized with $$h_{33} = 1 \text{ or } h_{11}^2 + h_{11}^2 + h_{12}^2 + h_{13}^2 + h_{21}^2 + h_{22}^2 + h_{23}^2 + h_{31}^2 + h_{32}^2 + h_{33}^2 = 1.$$

To find these parameters, four or more corresponding points in the sensor data and the video frame may be used. Detected players and their position on the ground plane may be used as landmarks. For American football, for example, there are 22 player markers in the metadata 2D plane 701 and a variable number of detected players in the video frame as shown through the data points 702 in FIGS. 7A-7B.

As the correlation between the player locations on the metadata plane and the play locations as shown in the video stream is unknown, one or more homographies may be computed for a subset of point correspondences. In some instances, multiple homographies may be performed and the homography that maps the points with minimal error is chosen as the final transformation. Heuristics may be used to intelligently sample a smaller set of combinations to reduce the search space while still ensuring method robustness.

First, as shown in FIG. 7C-7D, points with the maximum and minimum x and y coordinate values in the 2D plane 701 may be removed. A subset 704 of points (for example, 10 points from the remaining 18 points) may be selected by selecting points with highest and lowest x coordinate values. Similarly, a set of player boxes (for example, eight player boxes) may be selected in the video frame (for example, bounding boxes 710-728). This process provides for the selection of the best candidates for the homography computation which are well distributed across the video frame (to avoid co-linear points) and also avoid points which may be outside the video frame.

In one or more embodiments, each point combination may be matched with all permutations of four players from the pruned set of player detections in the frame. The midpoint of the bottom line of the bounding box may be used as the position in the video frame (however, this is not limiting and any portion of the bounding box or outside of the bounding box may also be used). The bottom line of the bounding box may be used because even though the sensors are in the shoulder pads of the players, the metadata is 2D in nature and the player positions are obtained with respect to the 2D field plane 701. The homography matrix is determined for each set of corresponding points and a cost metric which is the sum of distances to the nearest player box for each mapped data point may be calculated. Thus, a one-to-one mapping between the point coordinates and the bounding boxes may be created. The homography matrix which has the least cost may be selected and as this process is computationally intensive, the processing is done in parallel.

The homography matrix is computed for each set of corresponding points along with a cost metric which is the sum of distances to the nearest player location for each mapped point. This creates a one-to-one mapping between every bounding box detected in the video frame and the point coordinates which are within the frame limits. The transformation with the least cost is selected. To make the process efficient, the computation of the different homography matrices are performed in parallel.

FIGS. 8A-8D depict a comparison of different homography computation approaches for a given video frame 800. That is, different approaches may be used in parallel. The results of the different approaches may be compared and the results from the most effective approach may be used. While one particular homography approach may produce the most effective results at a first time, this homography approach may not necessarily always produce the most accurate results. Thus, the various different approaches may be used in parallel such that the approach that is currently producing the most effective results at any given time may be used.

Figure 8A:
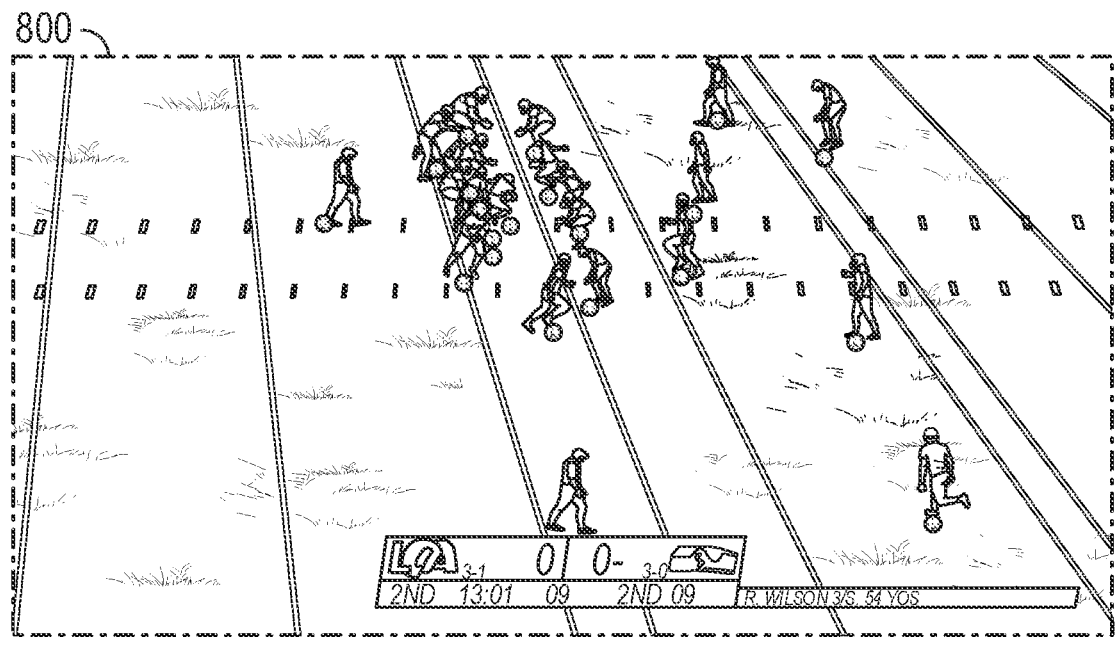
FIGS. 8A-8D depict an example use case for homography mapping in accordance with one or more example embodiments of the disclosure.
Figure 8B:
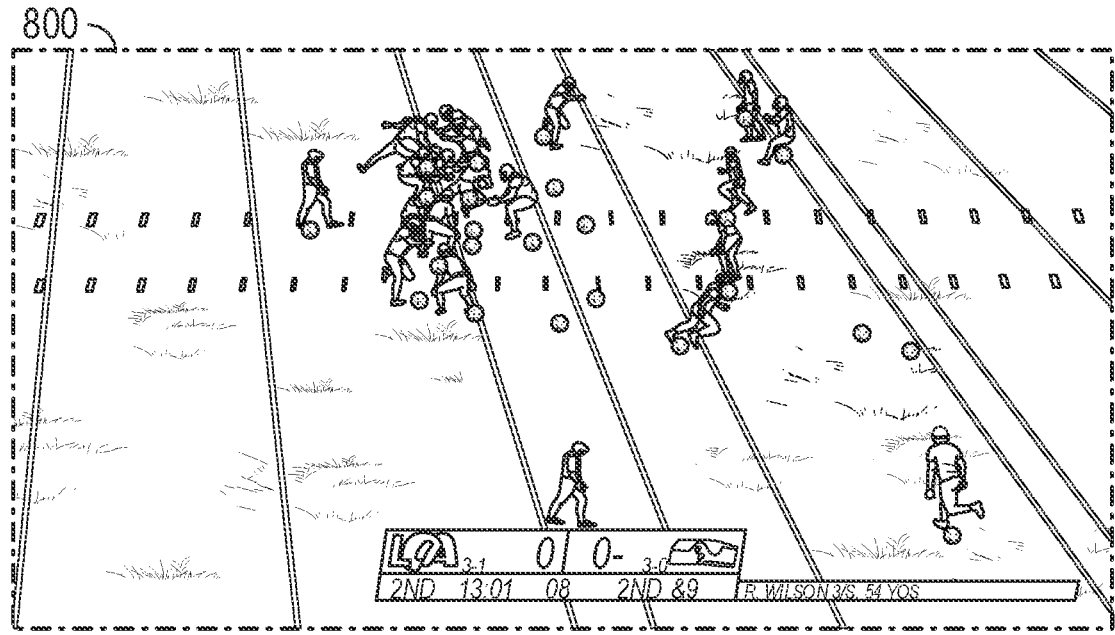
Figure 8C:
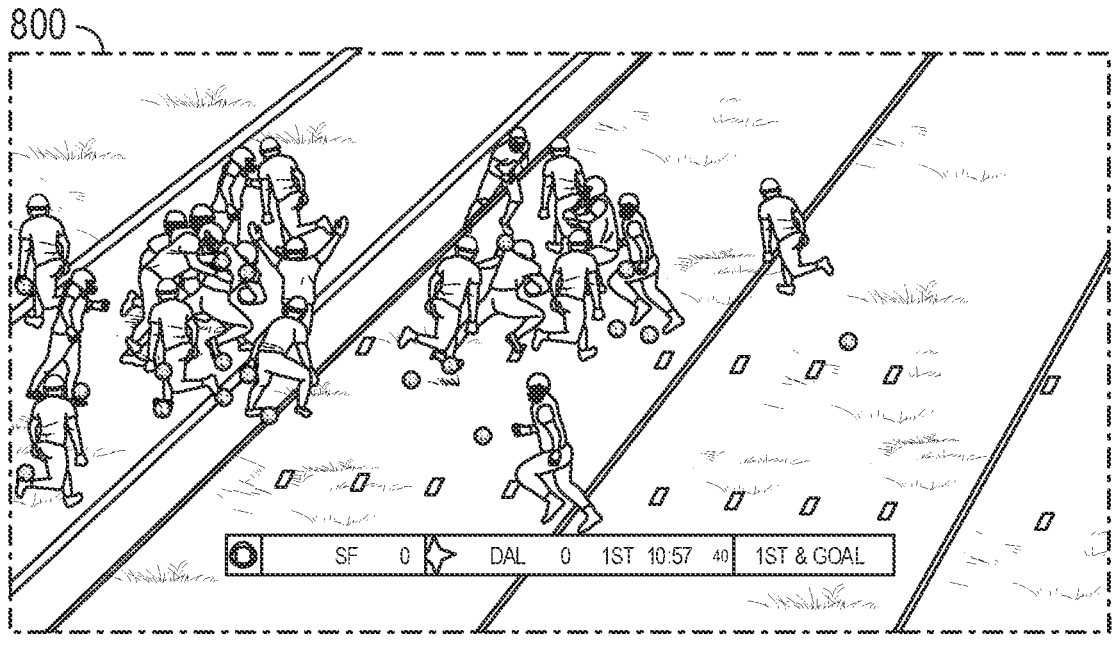
Figure 8D:
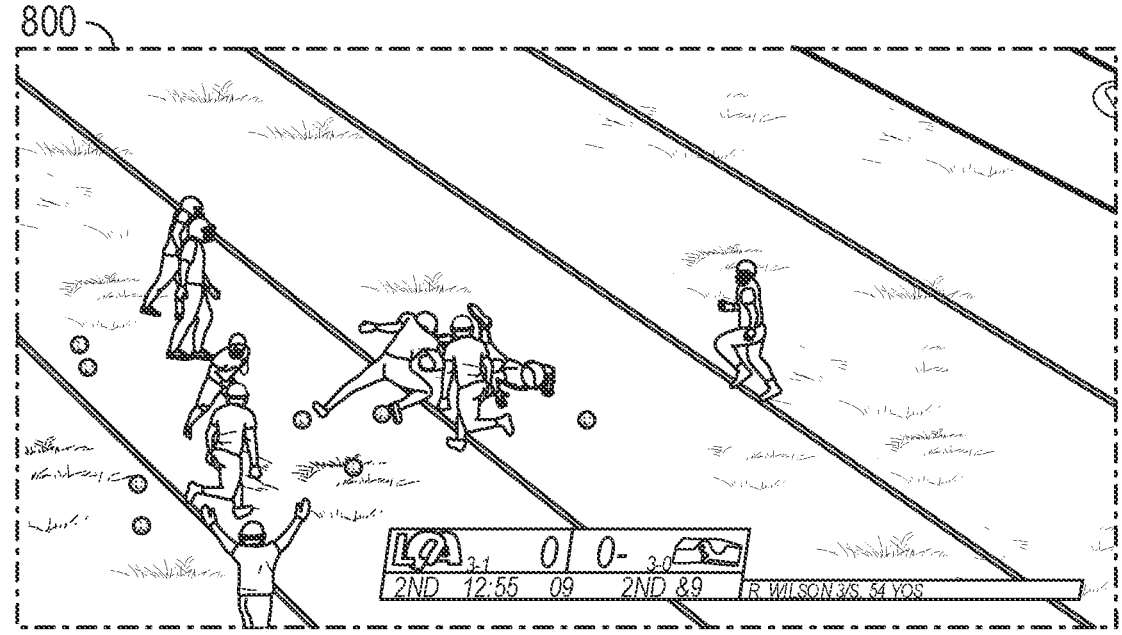

In one or more embodiments, the effectiveness of a given homography approach may be determined by comparing how closely they are to the bounding boxes in the frame. FIG. 8A shows that a first homography approach produces a medium distance cost of 6. FIG. 8B shows that a second homography approach produces a medium distance cost of 15. FIG. 8C shows that a third homography approach produces a medium distance cost of 31. FIG. 8D shows that a fourth homography approach produces a medium distance cost of 119. In this particular example, the homography approach used to produce the results shown in FIG. 8A may be selected over the remaining three approaches because the medium distance cost is the smallest for the first homography approach.

Operation 412 involves performing helmet track identification. Once the computed transformation maps all metadata 2D plane points to the frame coordinates, the corresponding helmet tracks may be identified for each mapped point. Helmet tracking may be used to track players across frames because helmet bounding boxes are small in size and have a much lower probability of occlusion compared to the player boxes. Helmet tracking provides longer and more precise tracks compared to player tracking. However, any other object and/or portion of a player's body may also be tracked.

To ensure a more robust matching between the metadata point to bounding box, a dummy player bounding box may be created for the point corresponding to the player of interest with the height and width as the maximum height and width observed in the player detection results for the video frame. The intersection over union (IoU) of this dummy box may be calculated for every detected box. The player bounding box with maximum IoU may be selected if it has an IoU that is greater than or equal to a threshold value (for example, 0.25). In the absence of a matching box, the dummy box may be assumed to be the desired bounding box. The helmet track for which the bounding box has the maximum IoU with the upper one-third of the identified player bounding box may be selected as the helmet track for the target player.

In one or more embodiments, two methods may be used to propagate the homography between the metadata plane and the event frame across multiple frames. The first approach uses the player tracking information generated from the sensors, and the second approach uses keypoints detected on the ground plane of the video frame.

With respect to the first approach, homography between frame Fn (frame in metadata) and Fv (video frame) is used to identify the homography between Fn+i and Fv+3i (this may be the case if the metadata is 10 FPS and input video clips have 30 FPS). If the angle of the camera capturing the video frames is changed (for example, a different camera at a different angle is used or the angle of the current camera is adjusted), the homography may be recomputed.

Upon identifying the helmet tracks in a frame (Fv), all helmet tracks are selected which persist for the subsequent three frames (or any other number of subsequent frames). The corresponding player bounding boxes in the new frame (Fv+3) are extracted for these helmet tracks. The mid-point of the base of the player bounding boxes may serve as the points in the ground plane of the new video frame (Fv+3) which correspond to player points in the metadata 2D plane. These correspondences may be used to calculate the homography for the new frame. Three different homography matrices may be computed using the standard least squares method which uses all correspondences, and using robust methods (for example, least-median of squares) which can ignore outliers. The best homography matrix is selected using the cost metric defined for smart sampling based homography computation method.

With respect to the second approach, key points are identified between subsequent frames, which are then matched to find correspondence between the frames. Keypoints from sections of the frame which do not have any detected players or static graphics are used which ensures that only keypoints from the ground plane are used.

The inverse of the homography for the initial frame is used to transform all the keypoints in the current video frame to points in the 2D plane. The correspondence between the keypoints in the 2D plane and the ground plane of the next video frame is then used to compute the new homography. The robust least-median of squares method may be used to compute the transformation to avoid using any incorrect keypoint correspondences. The number of corresponding keypoints identified by this method is usually large and is hence robust.

Operation 414 involves generating presenting any desired graphics using the information included in the metadata. For example, as shown in the use case 200 for FIG. 2, a graphic 220 is presented over the broadcast of the live event such that viewers may view the graphic while viewing the broadcast of the live event. The particular graphic 220 shown in FIG. 2 is a probability that a player in offensive possession of a football is going to score a touchdown on the play being shown. The graphic 220 may be presented as an overlay during a replay of a previous play, for example, However, any other number of different types of graphics presenting various types of information may also be generated and presented as well. For example, a different graphic indicating the average and maximum speed of the player during the play may also be presented.

FIG. 9 depicts an example method for temporal synchronization of multimodal data streams in accordance with one or more example embodiments of the disclosure. Some or all of the blocks of the process flows or methods in this disclosure may be performed in a distributed manner across any number of devices or systems (for example, computing device 131, camera 129, user device 1102, computing device 1110, one or more sensors (such as sensors 122, 128, 1122, and 1128), video capture device 1129, and/or database 1130, computing device 1200, etc.). The operations of the method 200 may be optional and may be performed in a different order.

At block 902 of the method 900, computer-executable instructions stored on a memory of a system or device, such as computing device 131, camera 129, user device 1102, computing device 1110, one or more sensors (such as sensors 122, 128, 1122, and 1128), video capture device 1129, and/or database 1130, computing device 1200, etc., may be executed to receive first data associated with a live event, the first data including sensor data obtained from one or more sensors located at the live event.

In one or more embodiments, the live event may be a live sporting event, and the one or more sensors may be located at least one of: player equipment, game equipment, and a playing field. For example, RFID tags may be included within the equipment worn by the players and may be provided on or within a ball being used with the game. This sensor data may be the metadata as described herein. The metadata may also include granular information regarding all of the chronological proceedings in the play, such as key players involved, all events occurring, dynamic statistics about the play events and players, sensor data based on-ground positions of the players and the ball, etc. The metadata may also include any other information beyond the sensor data as well, such as indications of events that occurred during the game, manual annotations provided by a user, etc.

At block 904 of the method 900, computer-executable instructions stored on a memory of a system or device may be executed to receive second data associated with the live event, the second data including one or more video frames depicting the live event. The video frames may include the video of the live event that is captured and broadcasted to various viewers. Continuing the example of the American football game, one or more cameras may be included in a stadium in which the game is played. The cameras may capture video and/or audio feed of the game occurring on the field and broadcasted to the viewers in real-time. A viewer may view the live broadcast of the game through a streaming service, a cable television channel, and/or through any other format.

At block 906 of the method 900, computer-executable instructions stored on a memory of a system or device may be executed to determine, using a first computing model, that a first event is occurring within a first video frame of the one or more video frames. In one or more embodiments, the computing model may be a deep learning action recognition model that is trained using prior video frames in which the first event is occurring.

In one or more embodiments, determining that a first event is occurring within the first video frame is further based on a first temporal window, the first temporal window including a first number of video frames located sequentially before and after the first video frame within the one or more video frames. Additionally, determining that a first event is occurring within a first video frame of the one or more video frames may further include determining, using a second computing model and a second temporal window, a second probability that the first event is occurring within the first video frame and determining a third probability that the first event is occurring within the first video frame based on the first probability and the second probability, wherein determining that the first event is occurring within the first video frame is based on the third probability.

At block 908 of the method 900, computer-executable instructions stored on a memory of a system or device may be executed to determine a time stamp associated with the first event within the first data.

At block 910 of the method 900, computer-executable instructions stored on a memory of a system or device may be executed to perform a time synchronization between the first data and the second data based on the time stamp.

In one or more embodiments, performing the time synchronization is further based on a first frequency at which the one or more video frames are presented and a second frequency at which the first data is received.

In one or more embodiments, the method 600 may further include presenting, using the first data, a graphical overlay within a broadcast of the live event. For example, a graphic may be presented over the live broadcast of the sporting event providing information about players on the field, plays being made, and/or any other types of graphics that provide any other information. The information included within the graphics, in some instances, may be obtained from the metadata.

FIG. 10 depicts an example method 1000 for player identification and tracking in accordance with one or more example embodiments of the disclosure. Some or all of the blocks of the process flows or methods in this disclosure may be performed in a distributed manner across any number of devices or systems (for example, computing device 131, camera 129, user device 1102, computing device 1110, one or more sensors (such as sensors 122, 128, 1122, and 1128), video capture device 1129, and/or database 1130, computing device 1200, etc.). The operations of the method 200 may be optional and may be performed in a different order.

At block 1002 of the method 1000, computer-executable instructions stored on a memory of a system or device, such as computing device 131, camera 129, user device 1102, computing device 1110, one or more sensors (such as sensors 122, 128, 1122, and 1128), video capture device 1129, and/or database 1130, computing device 1200, etc., may be executed to receive first data associated with a live event, the first data being metadata including information about the live event. For example, in some instances, the metadata may include sensor data captured from one or more sensors located at the live event. However, the metadata may also include any other types of information, such as annotations provided by a user, and/or any other types of information described herein or otherwise.

At block 1004 of the method 1000, computer-executable instructions stored on a memory of a system or device may be executed to receive, from a video capture device, a first video frame of the live event.

At block 1006 of the method 1000, computer-executable instructions stored on a memory of a system or device may be executed to identify, using a computing model, a first location of the first person within the first video frame;

At block 1008 of the method 1000, computer-executable instructions stored on a memory of a system or device may be executed to map the sensor data to a second location within the first video frame using a first type of homography.

At block 1010 of the method 1000, computer-executable instructions stored on a memory of a system or device may be executed to determine based on a distance between the first location and the second location, that the first person in the first video frame is associated with the sensor data.

Figure 11:
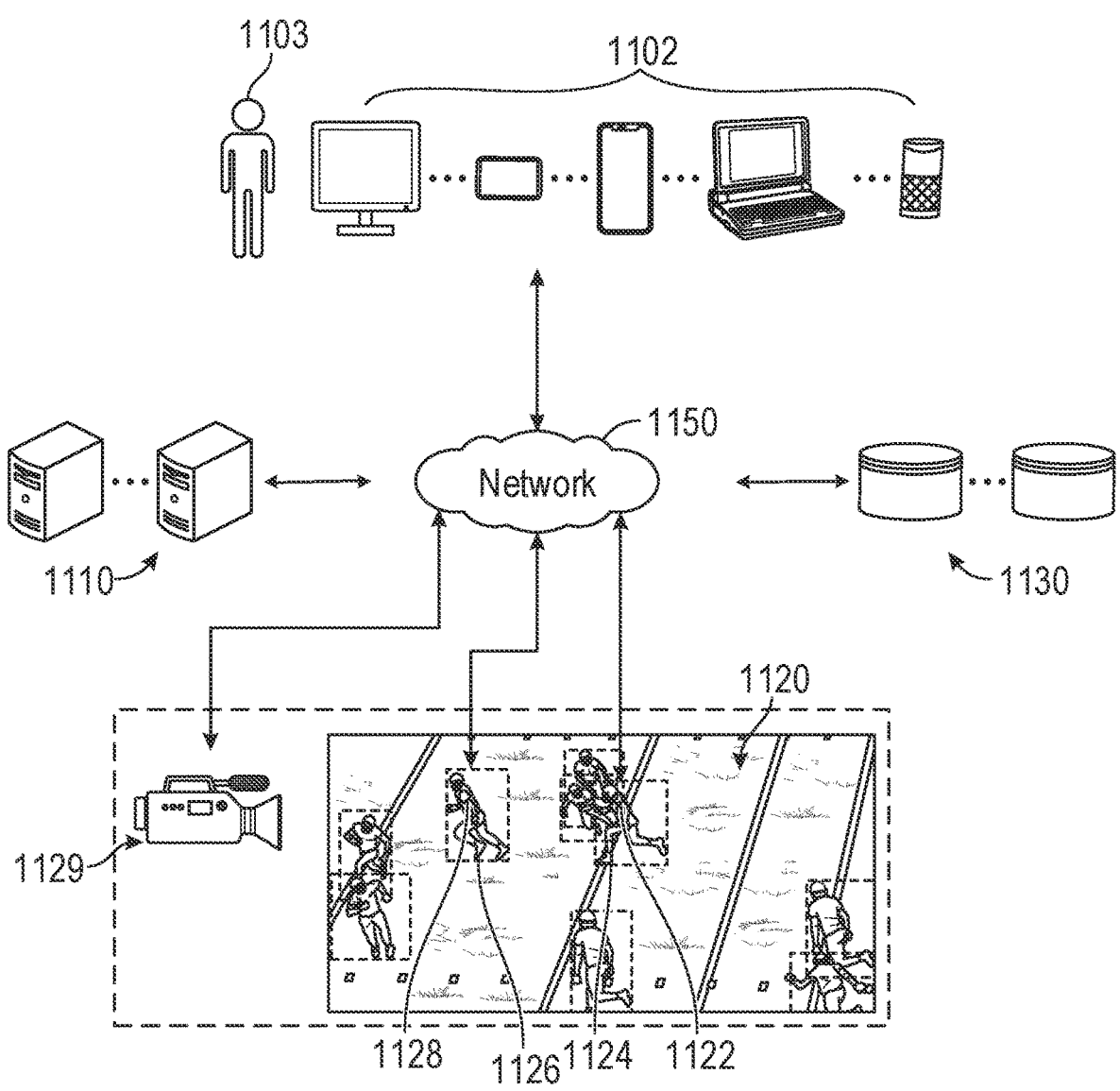
FIG. 11 depicts an example system in accordance with one or more example embodiments of the disclosure.

FIG. 11 is an example system 1100 for temporal synchronization and player identification and tracking. In one or more embodiments, the system may include one or more user devices 1102 (which may be associated with one or more users 1103), one or more computing devices 1110, one or more sensors (such as sensor 1122 and sensor 1128), a video capture device 1129, and/or one or more databases 1130. However, these components of the system 1100 are merely exemplary and are not intended to be limiting in any way. For simplicity, reference may be made hereinafter to a user device 1102, computing device 1110, a sensor, a video capture device 1129, database 1130, etc., however, this is not intended to be limiting and may still refer to any number of such elements.

The user device 1102 may be any type of device, such as a smartphone, desktop computer, laptop computer, tablet, and/or any other type of device. The user device 1102 may allow the user 1103 to view a live broadcast of a live event 1120 (an example is shown as an American football game in the system 1100). For example, the user device 1102 may be a television and the live event may be broadcasted to the television through a cable network. The live event may also be streamed to the television through a streaming service. The live event may also be viewed using the user device 1102 in any other suitable manner.

The computing device 1110 may be any type of device or system (such as a local or remote server for example) used to perform any of the processing described herein. For example, the computing device may receive data from various sources, such as metadata including data from the one or more sensors at the live event, as well as a video and/or audio feed of the live event captured by the video capture device 1129. The video capture device 1129, for example, may be a camera that is provided at the live event 1120 to capture video and/or audio feed of the live event in real-time. The computing device 1110 may host any of the computing models described herein and may perform time synchronization between the different types of data sources as described herein. The computing device 1110 may also perform player identification and tracking.

The database 1130 may store any of the data that is used as described herein. For example, the database 1130 may store any of the metadata that is provided to the computing device 1110 for processing.

In one or more embodiments, any of the elements of the system 1100 (for example, one or more mobile devices 1102, one or more computing devices 1110, video capture device 1129, one or more sensors, one or more databases 1130, and/or any other element described with respect to FIG. 1100 or otherwise) may be configured to communicate via a communications network 1150. The communications network 1150 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 1150 may have any suitable communication range associated therewith and may include, for example, global networks (e.g., the Internet), metropolitan area networks (MANs), wide area networks (WANs), local area networks (LANs), or personal area networks (PANs). In addition, communications network 620 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Finally, any of the elements of the system 1100 may include any of the elements of the computing device 1200 as well. For example, one or more processors 1202, memory 1204, etc.

Figure 12:
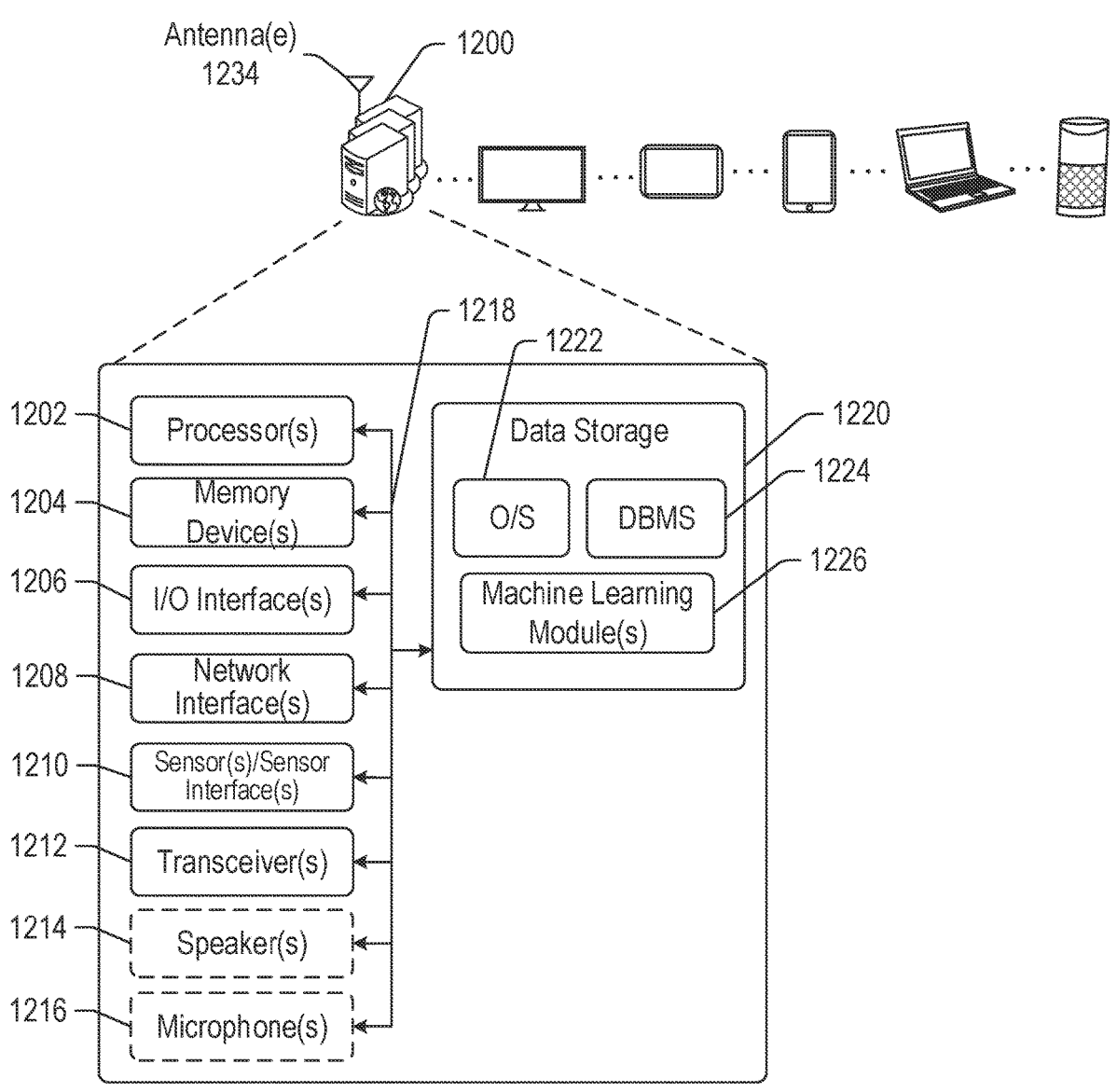
FIG. 12 depicts an example computing device in accordance with one or more example embodiments of the disclosure.

FIG. 12 is a schematic block diagram of an illustrative computing device 1200 in accordance with one or more example embodiments of the disclosure. The computing device 2100 may include, for example, the computing device 1110 and/or any other device or system as described herein.

The computing device 1200 may be configured to communicate via one or more networks with one or more servers, search engines, user devices, or the like. In some embodiments, a single remote server or single group of remote servers may be configured to perform more than one type of content rating and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 1200 may include one or more processors (processor(s)) 1202, one or more memory devices 1204 (generically referred to herein as memory 1204), one or more input/output (I/O) interface(s) 1206, one or more network interface(s) 1208, one or more sensors or sensor interface(s) 1210, one or more transceivers 1212, one or more optional speakers 1214, one or more optional microphones 1216, and data storage 1220. The computing device 1200 may further include one or more buses 1218 that functionally couple various components of the computing device 1200. The computing device 1200 may further include one or more antenna(e) 1234 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1218 may include at least one of a system bus, a memory bus, an address bus, or a message bus, and may permit exchange of information (e.g., data (including computer-executable code), signaling, etc.) between various components of the computing device 1200. The bus(es) 1218 may include, without limitation, a memory bus or a memory controller, a peripheral bus, an accelerated graphics port, and so forth. The bus(es) 1218 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 1204 of the computing device 1200 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1204 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1204 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1220 may include removable storage and/or non-removable storage including, but not limited to, magnetic storage, optical disk storage, and/or tape storage. The data storage 1220 may provide non-volatile storage of computer-executable instructions and other data. The memory 1204 and the data storage 1220, removable and/or non-removable, are examples of computer-readable storage media (CRSM) as that term is used herein.

The data storage 1220 may store computer-executable code, instructions, or the like that may be loadable into the memory 1204 and executable by the processor(s) 1202 to cause the processor(s) 1202 to perform or initiate various operations. The data storage 1220 may additionally store data that may be copied to memory 1204 for use by the processor(s) 1202 during the execution of the computer-executable instructions. Moreover, output data generated as a result of execution of the computer-executable instructions by the processor(s) 1202 may be stored initially in memory 1204, and may ultimately be copied to data storage 1220 for non-volatile storage.

More specifically, the data storage 1220 may store one or more operating systems (O/S) 1222; one or more database management systems (DBMS) 724; and one or more program module(s), applications, engines, computer-executable code, scripts, or the like such as, for example, one or more module(s) 1226. Some or all of these module(s) may be sub-module(s). Any of the components depicted as being stored in data storage 1220 may include any combination of software, firmware, and/or hardware. The software and/or firmware may include computer-executable code, instructions, or the like that may be loaded into the memory 1204 for execution by one or more of the processor(s) 1202. Any of the components depicted as being stored in data storage 1220 may support functionality described in reference to correspondingly named components earlier in this disclosure.

The data storage 1220 may further store various types of data utilized by components of the computing device 1200. Any data stored in the data storage 1220 may be loaded into the memory 1204 for use by the processor(s) 1202 in executing computer-executable code. In addition, any data depicted as being stored in the data storage 1220 may potentially be stored in one or more datastore(s) and may be accessed via the DBMS 1224 and loaded in the memory 1204 for use by the processor(s) 1202 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 12, the datastore(s) may include, for example, purchase history information, user action information, user profile information, a database linking search queries and user actions, and other information.

The processor(s) 1202 may be configured to access the memory 1204 and execute computer-executable instructions loaded therein. For example, the processor(s) 1202 may be configured to execute computer-executable instructions of the various program module(s), applications, engines, or the like of the computing device 1200 to cause or facilitate various operations to be performed in accordance with one or more embodiments of the disclosure. The processor(s) 1202 may include any suitable processing unit capable of accepting data as input, processing the input data in accordance with stored computer-executable instructions, and generating output data. The processor(s) 1202 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1202 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1202 may be capable of supporting any of a variety of instruction sets.

Referring now to functionality supported by the various program module(s) depicted in FIG. 12, the module(s) 1226 may include computer-executable instructions, code, or the like that responsive to execution by one or more of the processor(s) 1202 may perform functions including, but not limited to, performing time synchronization, player identification and tracking, and/or any other processing described herein or otherwise.

Referring now to other illustrative components depicted as being stored in the data storage 1220, the O/S 1222 may be loaded from the data storage 1220 into the memory 1204 and may provide an interface between other application software executing on the computing device 1200 and hardware resources of the computing device 1200. More specifically, the O/S 1222 may include a set of computer-executable instructions for managing hardware resources of the computing device 1200 and for providing common services to other application programs (e.g., managing memory allocation among various application programs). In certain example embodiments, the O/S 1222 may control execution of the other program module(s) to dynamically enhance characters for content rendering. The O/S 1222 may include any operating system now known or which may be developed in the future including, but not limited to, any server operating system, any mainframe operating system, or any other proprietary or non-proprietary operating system.

The DBMS 1224 may be loaded into the memory 1204 and may support functionality for accessing, retrieving, storing, and/or manipulating data stored in the memory 1204 and/or data stored in the data storage 1220. The DBMS 1224 may use any of a variety of database models (e.g., relational model, object model, etc.) and may support any of a variety of query languages. The DBMS 1224 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computing device 1200 is a mobile device, the DBMS 1224 may be any suitable light-weight DBMS optimized for performance on a mobile device.

Referring now to other illustrative components of the computing device 1200, the input/output (I/O) interface(s) 1206 may facilitate the receipt of input information by the computing device 1200 from one or more I/O devices as well as the output of information from the computing device 1200 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 1200 or may be separate. The I/O devices may further include, for example, any number of peripheral devices such as data storage devices, printing devices, and so forth.

The I/O interface(s) 1206 may also include an interface for an external peripheral device connection such as universal serial bus (USB), FireWire, Thunderbolt, Ethernet port or other connection protocol that may connect to one or more networks. The I/O interface(s) 1206 may also include a connection to one or more of the antenna(e) 1234 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The computing device 1200 may further include one or more network interface(s) 1208 via which the computing device 1200 may communicate with any of a variety of other systems, platforms, networks, devices, and so forth. The network interface(s) 1208 may enable communication, for example, with one or more wireless routers, one or more host servers, one or more web servers, and the like via one or more of networks.

The antenna(e) 1234 may include any suitable type of antenna depending, for example, on the communications protocols used to transmit or receive signals via the antenna(e) 1234. Non-limiting examples of suitable antennas may include directional antennas, non-directional antennas, dipole antennas, folded dipole antennas, patch antennas, multiple-input multiple-output (MIMO) antennas, or the like. The antenna(e) 1234 may be communicatively coupled to one or more transceivers 1212 or radio components to which or from which signals may be transmitted or received.

As previously described, the antenna(e) 1234 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 1234 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 1234 may be configured to transmit or receive radio frequency signals within any suitable frequency range forming part of the unlicensed portion of the radio spectrum.

The antenna(e) 1234 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1212 may include any suitable radio component(s) for—in cooperation with the antenna(e) 1234—transmitting or receiving radio frequency (RF) signals in the bandwidth and/or channels corresponding to the communications protocols utilized by the computing device 1200 to communicate with other devices. The transceiver(s) 1212 may include hardware, software, and/or firmware for modulating, transmitting, or receiving—potentially in cooperation with any of antenna(e) 1234—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1212 may further include hardware, firmware, or software for receiving GNSS signals. The transceiver(s) 1212 may include any known receiver and baseband suitable for communicating via the communications protocols utilized by the computing device 1200. The transceiver(s) 1212 may further include a low noise amplifier (LNA), additional signal amplifiers, an analog-to-digital (A/D) converter, one or more buffers, a digital baseband, or the like.

The sensor(s)/sensor interface(s) 1210 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 1214 may be any device configured to generate audible sound. The optional microphone(s) 1216 may be any device configured to receive analog sound input or voice data.

It should be appreciated that the program module(s), applications, computer-executable instructions, code, or the like depicted in FIG. 12 as being stored in the data storage 1220 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computing device 1200, and/or hosted on other computing device(s) accessible via one or more networks, may be provided to support functionality provided by the program module(s), applications, or computer-executable code depicted in FIG. 12 and/or additional or alternate functionality. Further, functionality may be modularized differently such that processing described as being supported collectively by the collection of program module(s) depicted in FIG. 12 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionalities described as being supported by any of the program module(s) depicted in FIG. 12 may be implemented, at least partially, in hardware and/or firmware across any number of devices.

It should further be appreciated that the computing device 1200 may include alternate and/or additional hardware, software, or firmware components beyond those described or depicted without departing from the scope of the disclosure. More particularly, it should be appreciated that software, firmware, or hardware components depicted as forming part of the computing device 1200 are merely illustrative and that some components may not be present or additional components may be provided in various embodiments. While various illustrative program module(s) have been depicted and described as software module(s) stored in data storage 1220, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
receiving first data associated with a live event, the first data including sensor data obtained from one or more sensors at a live sporting event, wherein the one or more sensors are located at least one of: player equipment, game equipment, and a playing field;
receiving second data associated with the live event, the second data including one or more video frames depicting the live event;
determining, using a first machine learning model and a first temporal window, a first probability that a first event associated with a play of the live sporting event is occurring within a first video frame of the one or more video frames, the first temporal window including a first number of video frames located sequentially before and after the first video frame within the one or more video frames;
determining, using a second machine learning model and a second temporal window, a second probability that the first event associated with the play of the live sporting event is occurring within the first video frame, the second temporal window including a second number of video frames located sequentially before and after the first video frame within the one or more video frames;
determining a third probability that the first event is occurring within the first video frame based on the first probability and the second probability;
determining, based on the third probability surpassing a threshold probability, that the first event is occurring within the first video frame;
determining a time stamp associated with the first event within the first data;
performing a time synchronization between the first data and the second data based on the time stamp; and
presenting, using the first data, a graphical overlay within a live broadcast of the live sporting event.

2. The method of claim 1, further comprising:
determining, using a third machine learning model and a third temporal window, a fourth probability that the first event associated with the play of the live sporting event is occurring within the first video frame, the third temporal window including a third number of video frames located sequentially before and after the first video frame within the one or more video frames, wherein determining the third probability is further based on the fourth probability.

3. The method of claim 1, wherein performing the time synchronization is further based on a first frequency at which the one or more video frames are presented and a second frequency at which the first data is received.

4. The method of claim 1, wherein the first machine learning model is a deep learning action recognition model that is trained using prior video frames in which the first event is occurring.

5. A method comprising:

receiving first data associated with a live event, the first data being metadata including information about the live event;

receiving second data associated with the live event, the second data including one or more video frames depicting the live event;

determining, using a first computing model and using a first temporal window, that a first event is occurring within a first video frame of the one or more video frames comprising:

determining a first probability that the first event is occurring within the first video frame;

determining that the first probability is greater than a threshold probability;

determining, using a second computing model and a second temporal window, a second probability that the first event is occurring within the first video frame; and determining a third probability that the first event is occurring within the first video frame based on the first probability and the second probability, wherein determining that the first event is occurring within the first video frame is based on the third probability;

determining a time stamp associated with the first event within the first data; and performing a time synchronization between the first data and the second data based on the time stamp.

6. The method of claim 5, wherein the first temporal window including a first number of video frames located sequentially before and after the first video frame within the one or more video frames.

7. The method of claim 5, further comprising:

presenting, using the first data, a graphical overlay within a broadcast of the live event.

8. The method of claim 5, wherein performing the time synchronization is further based on a first frequency at which the one or more video frames are presented and a second frequency at which the first data is received.

9. The method of claim 5, wherein the live event is a live sporting event, wherein the metadata includes sensor data captured from one or more sensors, and wherein the one or more sensors are located at least one of: player equipment, game equipment, and a playing field.

10. The method of claim 5, wherein the first computing model is a deep learning action recognition model that is trained using prior video frames in which the first event is occurring.

11. A system comprising:

memory that stores computer-executable instructions; and one or more processors configured to access the memory and execute the computer-executable instructions to:

receive first data associated with a live event, the first data being metadata including information about the live event;

receive second data associated with the live event, the second data including one or more video frames depicting the live event;

determine, using a first computing model, that a first event is occurring within a first video frame of the one or more video frames comprising:

determine a first probability that the first event is occurring within the first video frame;

determine that the first probability is greater than a threshold probability;

determine, using a second computing model and a second temporal window, a second probability that the first event is occurring within the first video frame; and determine a third probability that the first event is occurring within the first video frame based on the first probability and the second probability, wherein determining that the first event is occurring within the first video frame is based on the third probability;

determine a time stamp associated with the first event within the first data; and perform a time synchronization between the first data and the second data based on the time stamp.

12. The system of claim 11, wherein the first temporal window including a first number of video frames located sequentially before and after the first video frame within the one or more video frames.

13. The system of claim 11, further comprising:

presenting, using the first data, a graphical overlay within a broadcast of the live event.

14. The system of claim 11, wherein performing the time synchronization is further based on a first frequency at which the one or more video frames are presented and a second frequency at which the first data is received.

15. The system of claim 11, wherein the live event is a live sporting event, wherein the metadata includes sensor data captured from one or more sensors, and wherein the one or more sensors are located at least one of: player equipment, game equipment, and a playing field.

16. The system of claim 11, wherein the first computing model is a deep learning action recognition model that is trained using prior video frames in which the first event is occurring.

\* \* \* \* \*